US006026562A

United States Patent [19]

McMillin et al.

[11] Patent Number: 6,026,562

[45] Date of Patent: Feb. 22, 2000

[54] GLOBAL TERMINAL ASSEMBLY DIE

[75] Inventors: Fred McMillin, Warren; Frederick H Stringer, Youngstown; John E. W. Davis; Thomas Edward Lazor, both of Warren, all of Ohio

[73] Assignee: General Motors Corporation, Detroit, Mich.

[21] Appl. No.: 08/883,469

[22] Filed: Jun. 25, 1997

[51] Int. Cl.[7] .......... B23P 19/00

[52] U.S. Cl. .......... 29/748; 29/33 M; 29/753; 72/470

[58] Field of Search .......... 29/748, 33 M, 29/751, 753, 755, 861, 863; 72/441, 470

[56] References Cited

U.S. PATENT DOCUMENTS

| | | | |
|---|---|---|---|
| 4,114,253 | 9/1978 | Loomis et al. | 29/566.2 |
| 4,400,873 | 8/1983 | Kindig et al. | 29/753 |
| 4,707,913 | 11/1987 | Moline | 29/753 |
| 4,718,160 | 1/1988 | Bulanda et al. | 29/566.2 |
| 4,790,173 | 12/1988 | Boutcher, Jr. | 72/446 |
| 5,033,187 | 7/1991 | Gloe et al. | 29/753 |
| 5,033,283 | 7/1991 | Gloe et al. | 72/481 |
| 5,074,033 | 12/1991 | Dassance et al. | 29/753 |
| 5,095,599 | 3/1992 | Gloe et al. | 29/33 M |
| 5,131,124 | 7/1992 | Skotek | 29/33 M |
| 5,289,713 | 3/1994 | Schafer | 72/446 |
| 5,317,812 | 6/1994 | McMillin et al. | 33/740 |
| 5,323,634 | 6/1994 | Wolfe et al. | 72/446 |
| 5,337,589 | 8/1994 | Gloe et al. | 72/11 |
| 5,375,317 | 12/1994 | Murakami et al. | 29/753 |
| 5,443,549 | 8/1995 | Mimuro et al. | 72/482 |
| 5,483,739 | 1/1996 | Smith et al. | 29/753 |
| 5,491,994 | 2/1996 | Baldyga | 72/20.1 |
| 5,500,999 | 3/1996 | Yagi et al. | 29/753 |
| 5,517,749 | 5/1996 | Zuin | 29/753 |
| 5,577,318 | 11/1996 | Smith et al. | 29/753 |
| 5,687,613 | 11/1997 | Swedberg | 72/424 |
| 5,706,570 | 1/1998 | Inoue et al. | 29/566.2 |
| 5,745,982 | 5/1998 | Klinedinst | 29/753 |
| 5,784,770 | 7/1998 | Long, Jr. et al. | 29/564.4 |

*Primary Examiner*—Lee Young
*Assistant Examiner*—Bobby Rushing, Jr.
*Attorney, Agent, or Firm*—Patrick M. Griffin

[57] ABSTRACT

An electrical terminal applicator includes a terminal assembly die that is installed in a press. The terminal assembly die is a modular design comprising a base unit assembly having several assemblies attached to it. These assemblies include a slide retainer assembly, a terminal feed assembly, a terminal guide and brake assembly, an upper tool pack assembly and a lower tool pack assembly. Other assemblies may be attached to the base unit assembly or substituted for the original assemblies to provide great versatility with respect to the types of terminals, tooling and presses that can be used in connection with the terminal assembly die.

10 Claims, 18 Drawing Sheets

GLOBAL TERMINAL ASSEMBLY DIE

This invention relates generally to electrical terminal applicators and more particularly to a terminal assembly die for attaching terminals to the ends of insulated electric wires.

BACKGROUND OF THE INVENTION

Electrical terminal applicators include a terminal assembly die for attaching terminals to the ends of insulated electric wires. The terminal assembly die is customarily designed for a single type of press and a specific terminal design. Thus a completely new terminal assembly die is required for attaching an identical terminal if a different type of press is used. A completely new terminal assembly die is also required for attaching a different terminal using the same press. This situation leads to the proliferation of terminal assembly dies and very expensive tooling costs in global operations that have several types of presses and several terminal assembly locations.

SUMMARY OF THE INVENTION

The object of this invention is to provide a terminal assembly die that is extremely versatile and adaptable with respect to the types of presses and tooling that can be used.

A feature of the invention is the terminal assembly die is modular and includes a base unit assembly that supports several replaceable and/or optional assemblies.

Another feature of the invention is that the terminal assembly die includes changeable tool pack assemblies.

Another feature of the invention is that the terminal assembly die includes a base unit assembly that slideably supports a slide retainer assembly that retains a changeable tool pack assembly.

Still another feature of the invention is that the terminal assembly die includes a base unit assembly that slidably supports a slide retainer assembly that includes core and insulation crimp adjusters.

Yet another feature of the invention is that the terminal assembly die includes a base unit assembly and a slide retainer assembly that can be adapted for use in different type presses with adapters and spacer plates.

Yet another feature of the invention is that the terminal assembly die can be configured for automatic or manual terminal feed.

Still yet another feature of the invention is that the terminal assembly die can be configured for automatically feeding terminals mechanically or pneumatically.

These and other objects, features and advantages of the invention will become more apparent from the following description of a preferred embodiment taken in conjunction with the accompanying drawing.

DESCRIPTION OF THE PREFERRED EMBODIMENTS

Figure 1:
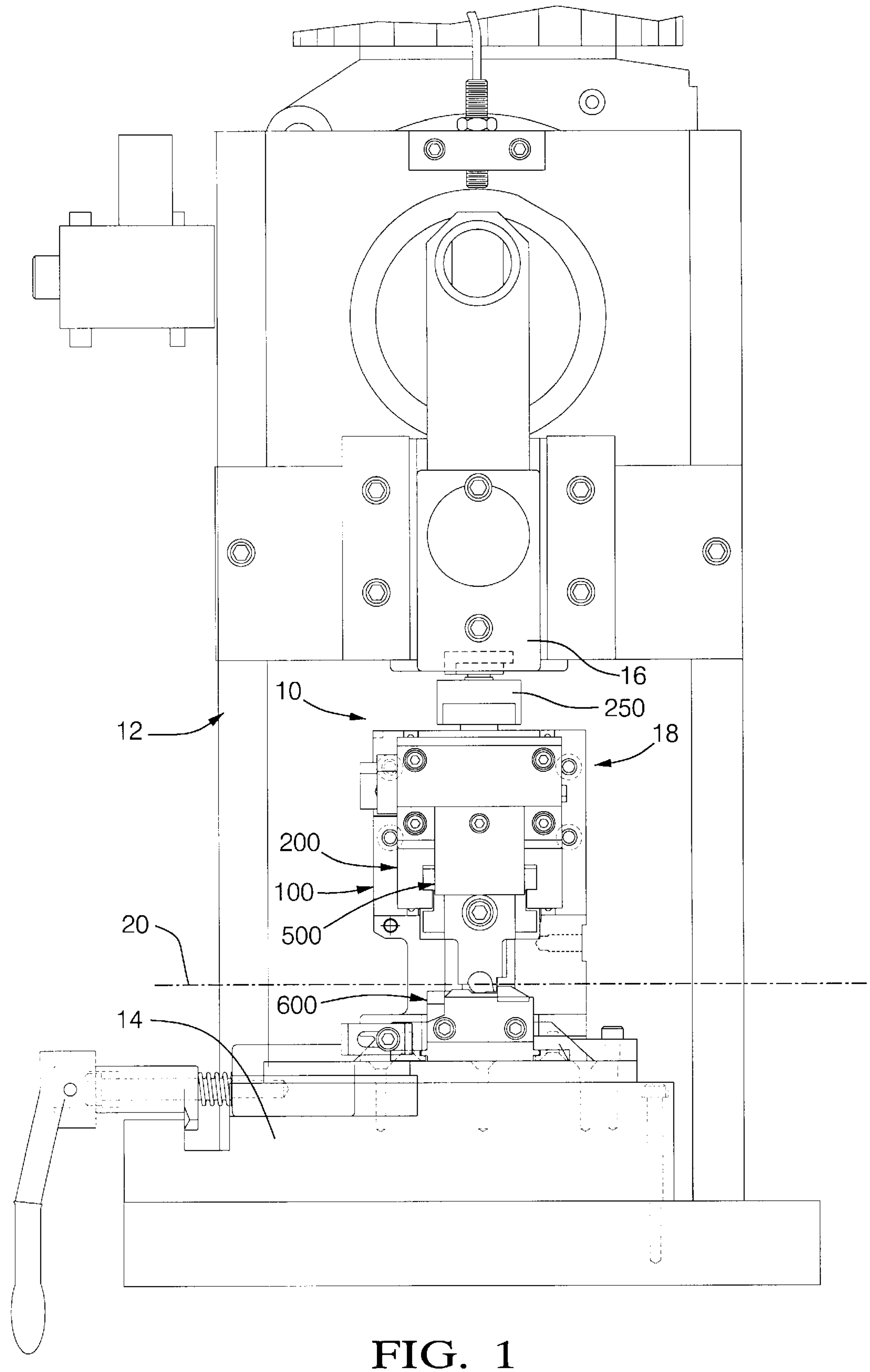
FIGS. 1 and 1*a* are front and side views of a press equipped with a terminal assembly die in accordance with the invention.
Figure 1A:
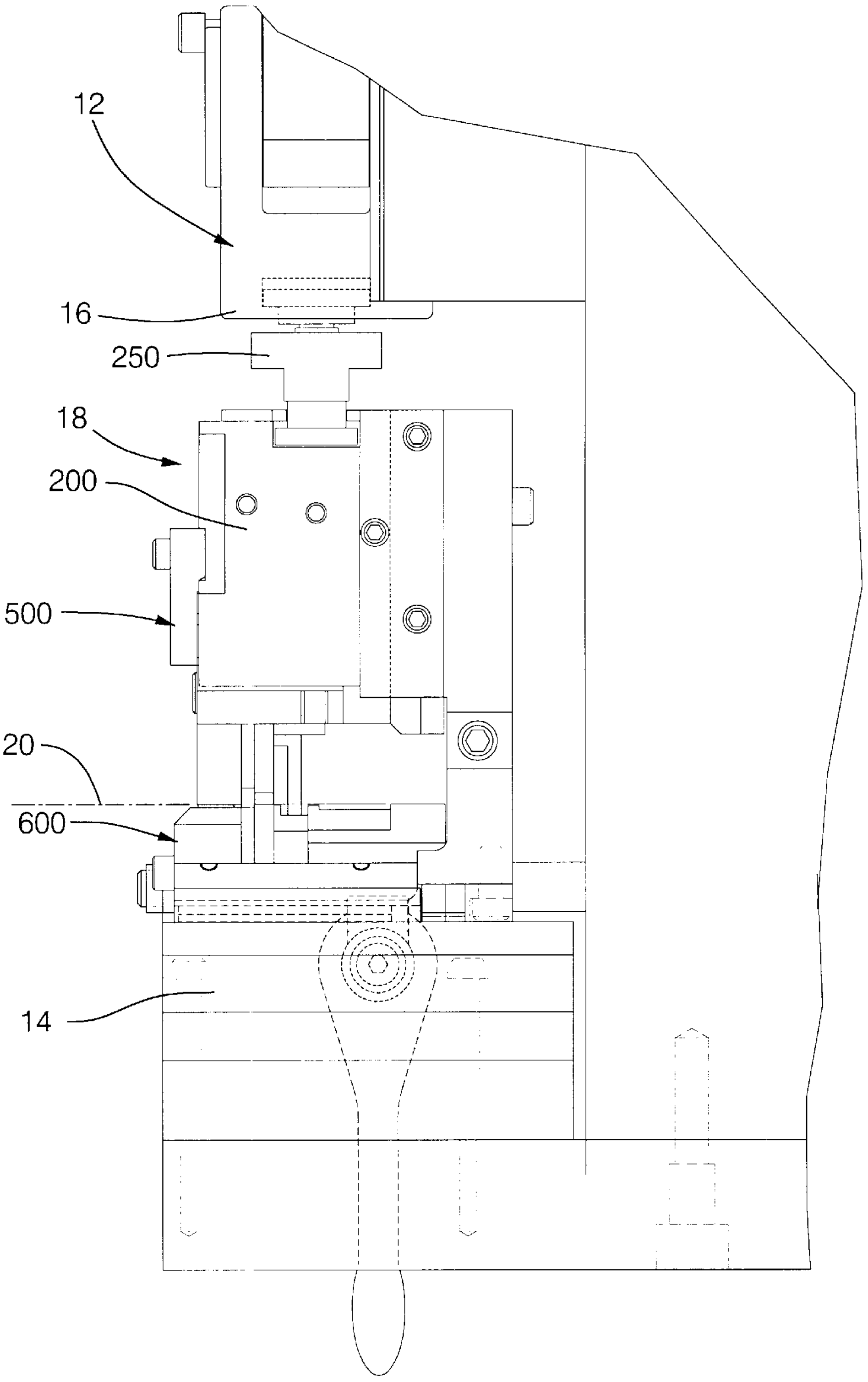

Referring now to FIGS. 1 and 1*a* of the drawing, an electrical terminal applicator shown generally at 10 comprises a press 12 having a bed 14 and a ram head 16 that is raised and lowered mechanically in well known manner.

The electrical terminal applicator 10 further includes a terminal assembly die 18 that is installed in the press 12 so that the terminal assembly die 18 is fastened to the bed 14 of the press 12 and operated by ram head 16. Parts of the terminal assembly die 18 have been omitted in FIGS. 1 and 1*a* for clarity.

There are many types of presses that are used in electrical terminal applicators in the wiring industry globally. Each type press has a unique type tooling. Three major types may be classified as European, Asian Pacific and North American corresponding to the major automotive markets. One of the objects of this invention is to provide a terminal assembly die 18 that can be adapted for use with any type of press and to use any type of tooling in any of the presses. Each variation operates on the same wire line 20 as the original tooling type. Wire line is the position of the centerline of the conductor core of the insulated electric wire in the electrical terminal applicator 10 when the terminal assembly die 18 is fully closed and the crimp wings of the lead terminal are tightly crimped to the conductor core and adjacent insulation of the electric wire.

Figure 2:
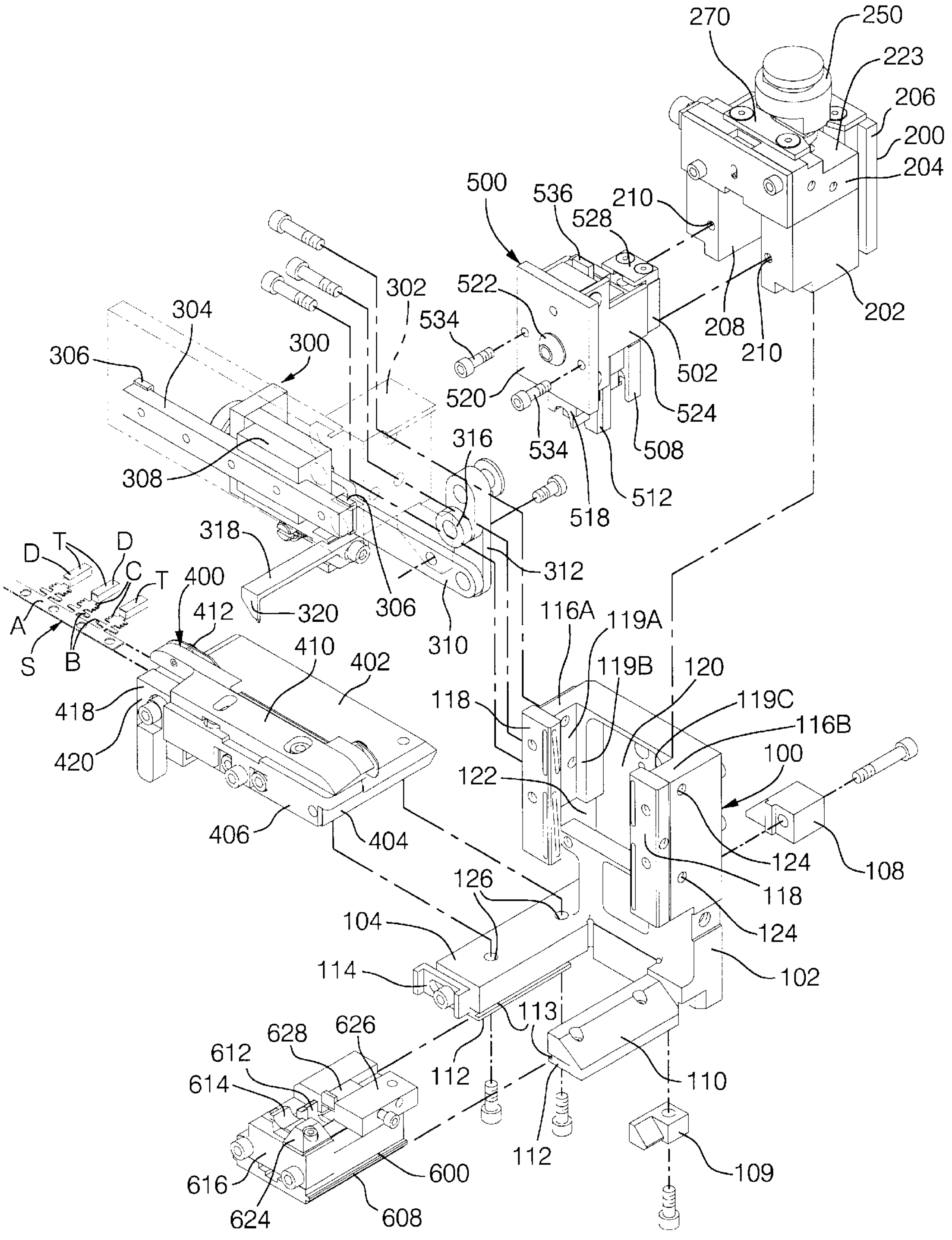
FIG. 2 is an exploded perspective view of the terminal assembly die shown in FIGS. 1 and 1*a;*

Referring now to FIG. 2, the terminal assembly die 18 is a modular design comprising a base unit assembly 100 having several assemblies attached to it. These assemblies include a slide retainer assembly 200, a mechanical feed assembly 300, a guide and brake assembly 400, an upper tool pack assembly 500 and a lower tool pack assembly 600. Other assemblies may be attached to the base unit assembly 100 or substituted for the assemblies shown in FIG. 2 to provide great versatility with respect to the types of tooling presses that can be used in connection with the terminal assembly die of this invention. For instance, the terminal assembly die 18 shown in FIG. 2 that is configured for use in a European type press with European type tooling can be adapted to use Asian Pacific or North American type tooling or adapted for use in Asian, Pacific or North American type presses using any of the three types of tooling by adding and/or substituting components or assemblies to the base unit assembly 100. This will be explained after a detailed description of the assemblies of the European configuration shown in FIG. 2.

The Base Unit Assembly

Figure 3:
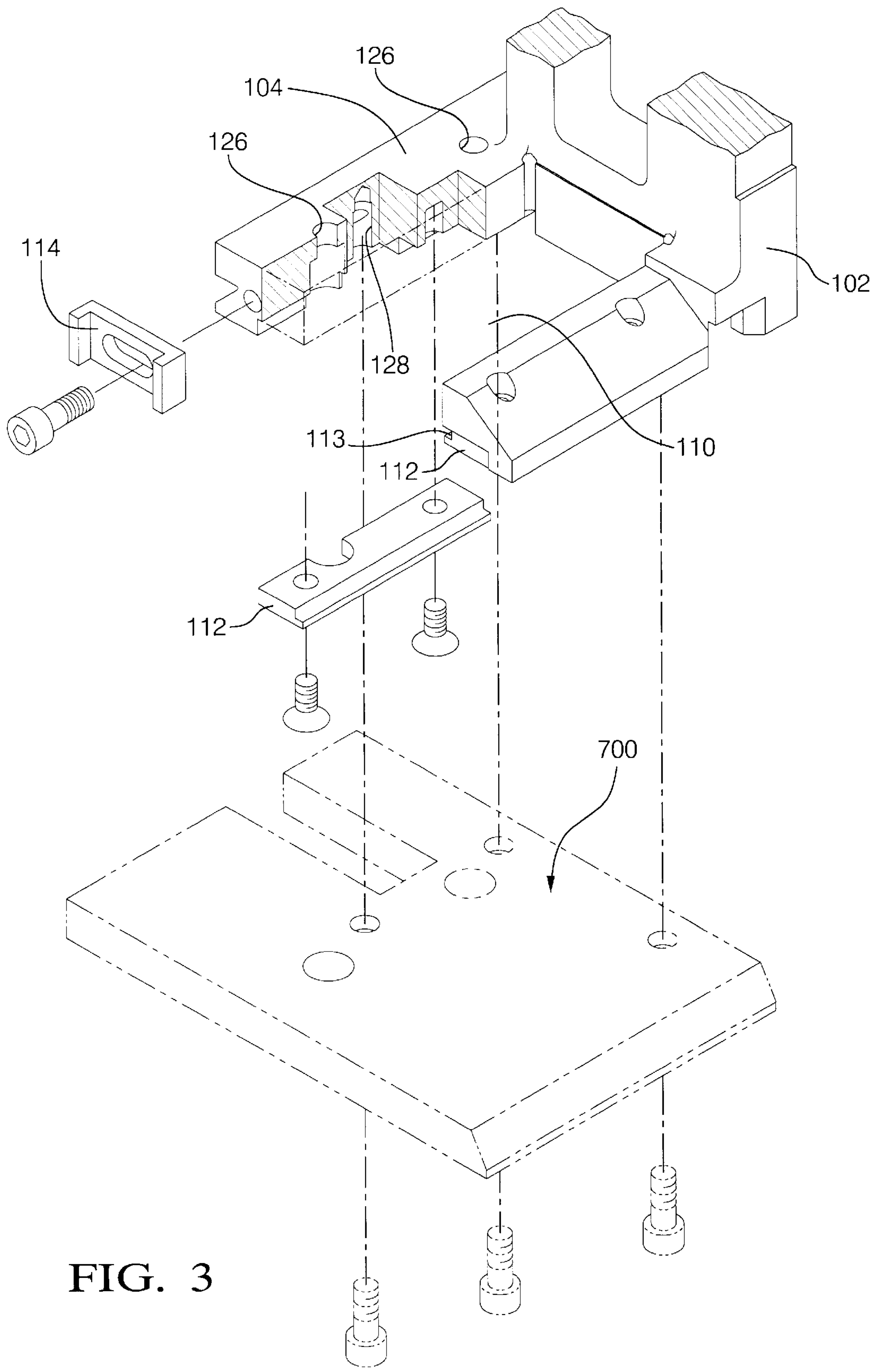
FIG. 3 is an enlargement of a portion of FIG. 2.

Referring now to FIGS. 2 and 3, the base unit assembly 100 is generally L-shaped with vertical and horizontal members 102 and 104. Horizontal member 104 has a clamp edge 106 and two clamp blocks 108 and 109 that fasten the base unit assembly 100 to the bed 14 of the European style press 12 in well known manner.

Horizontal member 104 has a central slot 110. Gibs 112 are fastened to the bottom of the horizontal member 104 on opposite sides of the central slot 110. Gibs 112 cooperate with the leg portion of the horizontal member 104 of the opposite sides of slot 110 to provide confronting horizontal tracks 113 for the lower tool pack assembly 600 that is slid into the horizontal tracks 113 and held in place by clamp plate 114 attached to the front of horizontal member 104.

Vertical member 102 has an upper portion that is generally U-shaped in cross-section to provide spaced side portions 116*a* and 116*b*. Gibs 118 are fastened to the respective faces of side portions 116*a* and 116*b* and cooperate with walls 119*a*, 119*b* and 119*c* of vertical member 104 to provide a vertical slide for slide retainer assembly 200. Slide retainer assembly 200 is attached to ram head 16 and reciprocates in the vertical slide of the base unit assembly 100 as ram head 16 is raised and lowered during the crimping cycles.

Wall 119*b* has a recess 120 that communicates with a slot 122 through side portion 116*a*. Recess 120 and slot 122 accommodate drive portions of mechanical feed assembly 300 that is fastened to side portion 116*a* by machine screws as explained below. Side portion 116*b* also has threaded holes 124 for attaching part of an alternate air feed assembly which is also explained below.

Horizontal member 104 also has threaded holes 126 opening into the upper surface for attaching guide and brake assembly 400 and three threaded holes 128 opening into the lower surface for attaching clamp plates such as clamp plate 700 shown in phantom, as explained below.

The Slide Retainer Assembly

Figure 4:
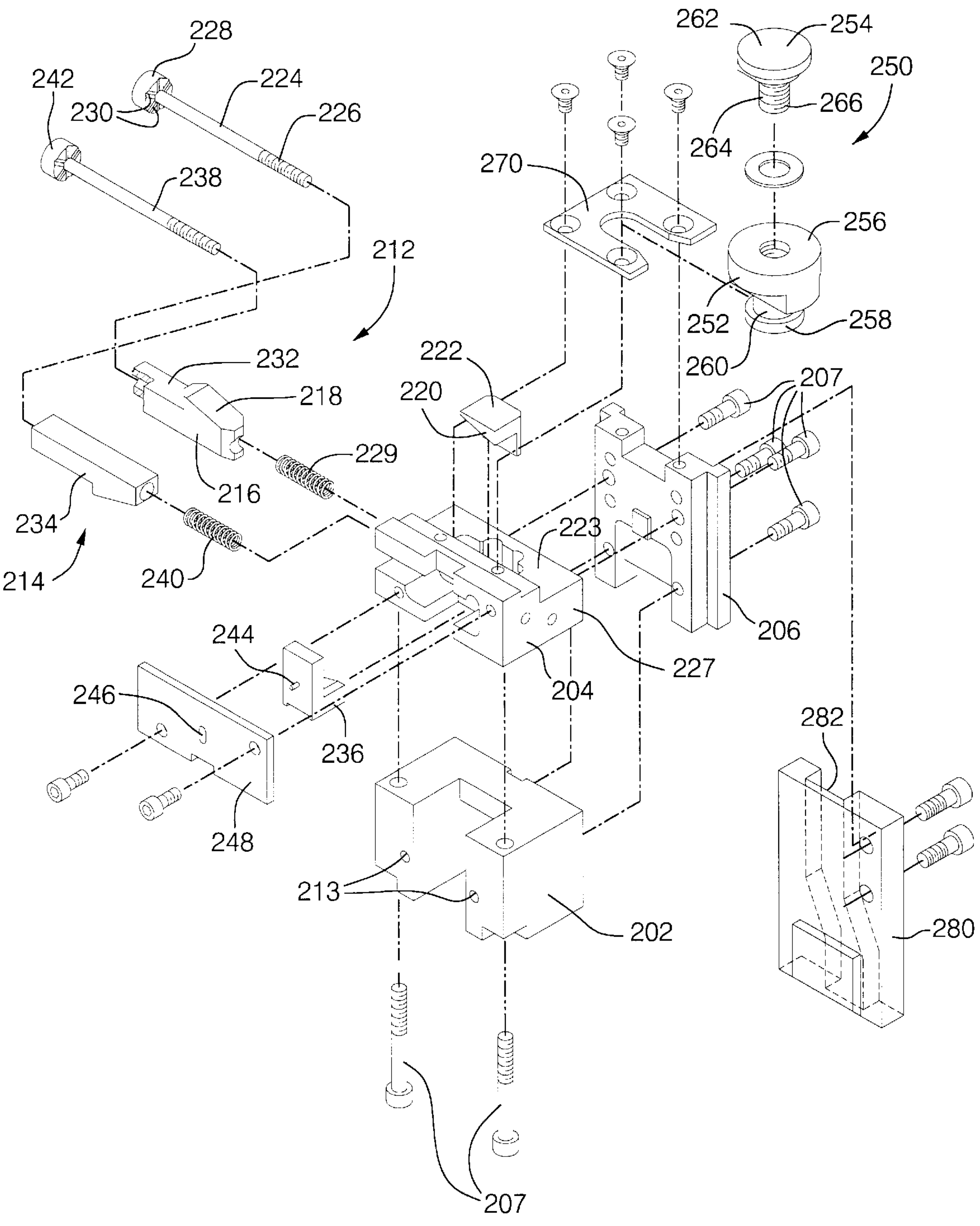
FIG. 4 is an exploded perspective view of the slide retainer assembly shown in FIG. 2.
Figure 4A:
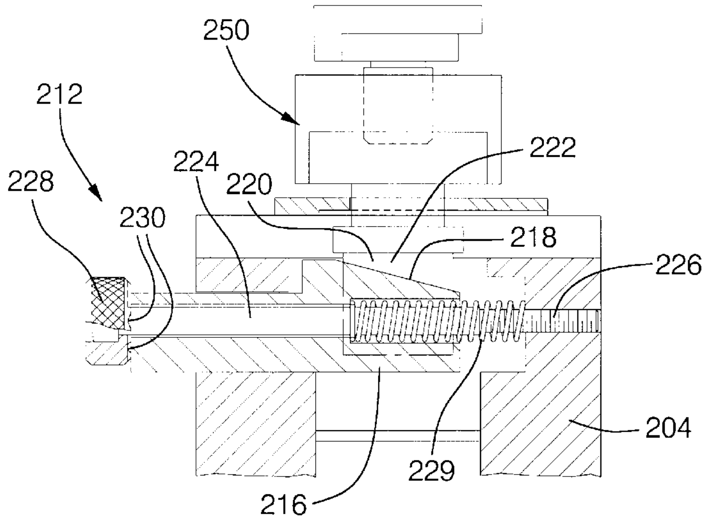
FIG. 4*a* is a vertical section of the slide retainer shown in FIG. 4.
Figure 4B:
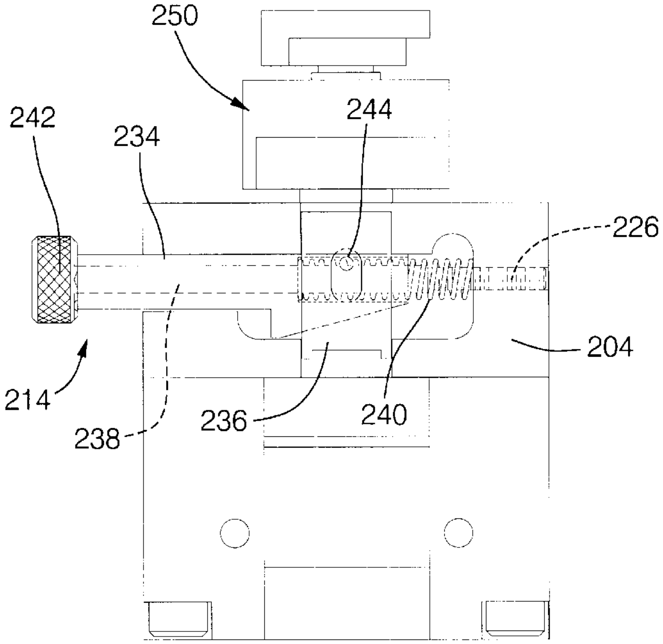
FIG. 4*b* is another vertical section of the slide retainer shown in FIG. 4.

Referring now to FIGS. 2 and 4, the slide retainer assembly 200 is attached to the ram head 16 so that it reciprocates in the base unit assembly 100 as ram head 16 is raised and lowered during the crimping cycles. Slide retainer assembly 200 holds upper tool pack assembly 500 and moves upper tool pack assembly 500 toward the lower tool pack assembly 600 retained in the horizontal member 104 of the base unit assembly 100 to close the die when the ram head 16 is lowered.

Slide retainer assembly 200 comprises a lower retainer block 202, an upper retainer block 204 and a slide plate 206 that are fastened together by six machine screws 207. The three pieces form a cavity 208 (FIG. 2) that receives the upper tool pack assembly 500. Lower retainer block 202 has two threaded holes 213 for attaching the upper tool pack assembly 500.

The upper retainer block 204 has a core adjuster 212 and an insulation adjuster 214 for adjusting the vertical position of the core and insulation crimping plates in the upper tool pack assembly 500 when the die is closed. Core adjuster 212 comprises an adjuster slide 216 that protrudes out the side of upper retainer block 204 and that includes an internal wedge 218. Wedge 218 engages wedge 220 of a strike pad 222 that protrudes above an upper surface 223 of the upper retainer block 204. Core adjuster 212 also includes a rotary operator 224 that extends through a longitudinal bore of adjuster slide 216. Operator 224 has a threaded end 226 that screws into a threaded hole in side wall 227 of upper retainer block 204 and an exposed head 228 at the opposite end that is adjacent the exposed end of adjuster slide 216. Adjuster slide 216 is biased away from side wall 227 by a compression spring 229 that is around the shank of the operator 224 between the inner end of adjuster slide 216 and the inner surface of side wall 227. Strike pad 222 is raised and lowered with respect to the upper retainer block 204 by wedge 218 when the head 228 of rotary operator 224 is turned to translate the adjuster slide 216 horizontally in the upper retainer block 204.

Core adjuster 212 is designed for a tactile adjustment. This is accomplished by a plurality of evenly spaced radial grooves 230 in the inboard face of head 228 and a raised round boss or pin 232 that is located on the end of adjuster slide 216 to intercept the radial grooves so that there is a tactile feel and preferably an audible click when the operator 224 is rotated from one groove to the next. As a practical matter, the core adjuster 212 (and all other crimp adjusters) can be designed so that there are six clicks per revolution and so that each click effects an adjustment of one-thousandths of an inch (0.001") in the axial or longitudinal direction.

Insulation adjuster 214 is similar comprising an adjuster slide 234 that includes a wedge that engages a wedge of a strike pad 236 that protrudes into the cavity 208 formed by parts 202, 204 and 206. Insulation adjuster 214 also includes a rotary operator 238 that extends through a bore of the adjuster slide 234 and screws into a threaded hole in side wall 227. Insulation adjuster 214 operates in the same manner so that strike pad 236 is raised and lowered with respect to the upper retainer block 204 when the exposed head 242 of the insulation adjuster 214 is turned to translate the adjuster slide 234 horizontally in the upper retainer block 204. As indicated above, insulation adjuster 214 is also equipped with radial grooves and a raised round boss or pin for producing a tactile feel and an audible click during adjustment.

Strike pad 236 has a pin 244 that is disposed in an elongated slot 246 of a cover plate 248. Cover plate 248 retains strike pad 236 in the upper retainer block 204 and limits vertical travel of the strike pad 236. Strike pad 222 has a similar arrangement for limiting vertical travel.

Figure 4C:
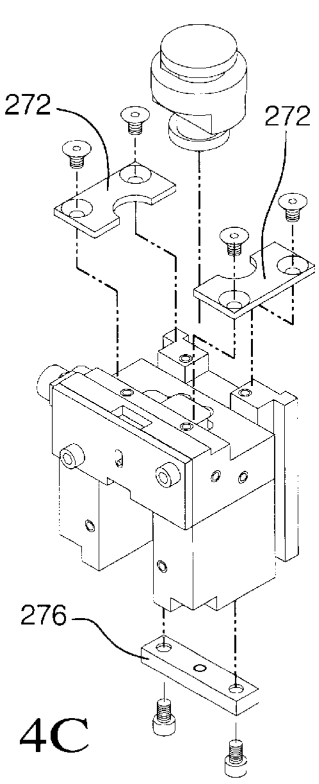
FIG. 4*c* is a perspective view of the slide retainer assembly of FIG. 4 with an alternate clamp plate assembly.

Slide retainer assembly 200 has a removable adapter 250 for connecting the slide retainer assembly 200 to the ram head 16 when the ram head 16 is of the European type characterized by a slotted head as shown in FIG. 1. Adapter 250 comprises a shank piece 252 and a connecting rod 254. Shank piece 252 has an enlarged upper body 256 connected to a lower head 258 by a shank 260. The connecting rod 254 has an upper head 262 and a shank 264 that is threaded at the lower end 266. Adapter 250 is connected to ram head 16 (FIG. 1) by inserting upper head 262 into the slot of ram head 16 and tightening the shank piece 252 down until the adapter 250 is clamped to ram head 16. The shank 260 is then inserted into a slot of a clamp plate 270 that is attached to the upper end of the slide retainer assembly 200 so that the clamp plate 270 is loosely retained between the upper body 256 and the lower head 258 so that adapter 250 transfers the closing force of ram head 16 to strike pad 220. Adapter 250 may include a spacer washer 268 to adjust the shut height of the dies. Clamp plate 270 may also be replaced by two clamp plates 272 as shown in FIG. 4*c* to retain adapter 250 with the terminal die assembly 18 when it is removed from the press 12.

A cam plate 280 is attached to the back of slide plate 206. Cam plate 280 is equipped with a cam slot 282 in the rear surface.

An optional keeper plate 276 can be attached to the bottom of retainer block 202 by machine screws. The optional keeper plate 276 is shown in FIG. 4*c* and the function of the optional keeper plate 276 is explained below.

The Mechanical Feed Assembly

Figure 5:
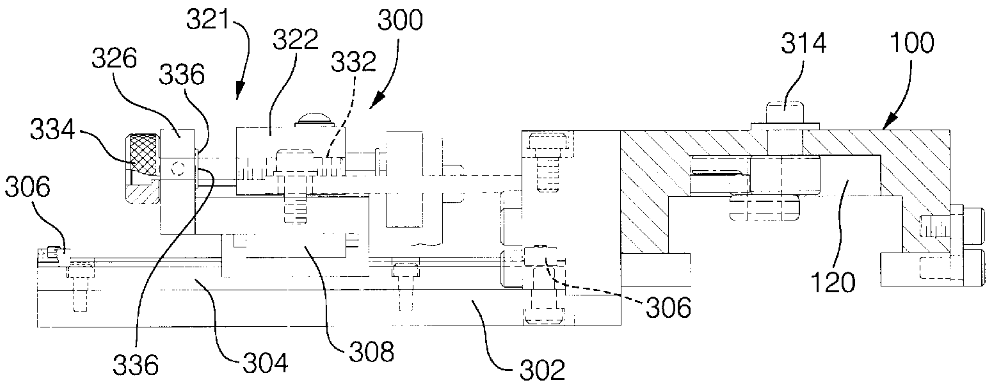
FIG. 5 is a top view of the mechanical feed assembly shown in FIG. 2.
Figure 5A:
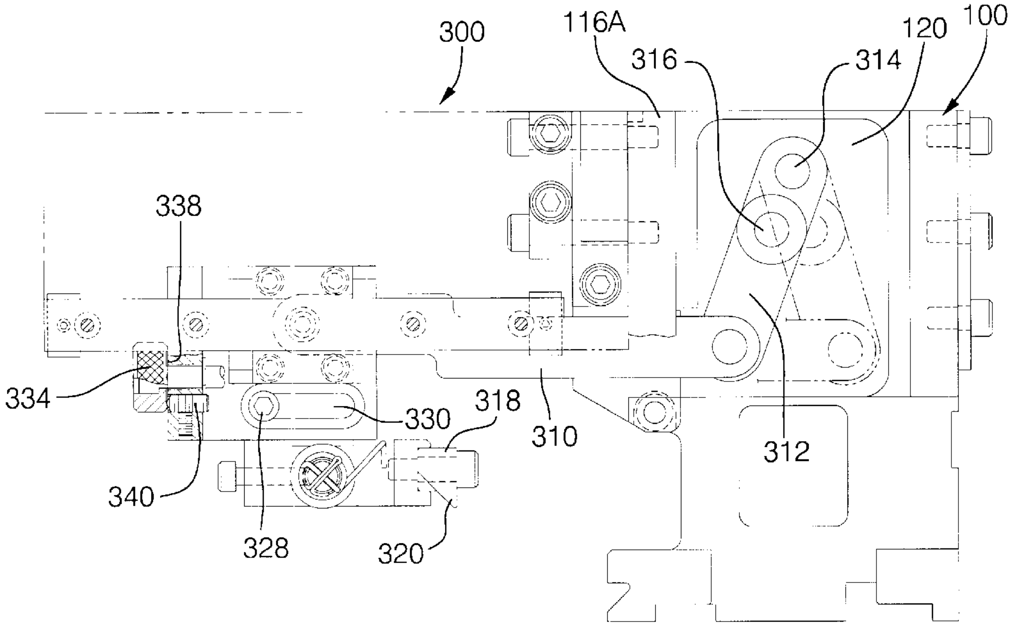
FIG. 5*a* is a front view of the mechanical feed assembly shown in FIGS. 2 and 5.

Referring now to FIGS. 2 and 5 and 5*a*, the mechanical feed assembly 300 feeds a strip of terminals S from a conventional supply reel (not shown) through guide and brake assembly 400 to the crimp area of the terminal assembly die 18 that is between the upper and lower tool pack assemblies 500 and 600 in a coordinated fashion.

Mechanical feed assembly 300 comprises a two piece bracket 302 that is fastened to the side 116*a* of the base unit assembly 100 by machine screws. Horizontal rail 304 is attached to the inner side of face plate of the bracket 302 and equipped with end stops 306. A trolley 308 slides on rail 304. Trolley 306 is driven by a two-bar linkage comprising link arms 310 and 312. Link arm 310 is pivotally attached to trolley 308 at one end. The opposite end of link arm 310 extends through slot 122 and into cavity 120 of base unit assembly 100 where the opposite end of link arm 310 is pivotally attached to link arm 312. Link arm 312 is disposed in cavity 120 and pivotally attached to the base unit assembly 100 by pivot pin 314 so that trolley 308 reciprocates on rail 304 when link arm 312 swings back and forth in an arc about pivot pin 314. Link arm 312 carries a cam follower in the form of a roller 316 that engages cam slot 282 of cam plate 280 that is attached to the slide retainer assembly 200. The cam slot 282 engages roller 316 to swing the link arm 312 back and forth as the slide retainer assembly 200 is raised and lowered by ram head 16.

Trolley 308 carries a pivotally attached, cantilevered feed finger 318 that extends forwardly over the guide and brake assembly 400 and terminates in a downward tip 320 that cooperates with the guide and brake assembly 400 to advance the terminal strip S, (FIG. 1) through the guide and brake assembly 400 to the crimping area of the terminal assembly die 18.

Feed finger 318 is attached to the trolley 308 by feed adjuster 321 (FIG. 5) comprising slide block 322, rotary operator 324 and side plate 326. Slide block 322 is attached to the lower portion of trolley 308 by a locking screw 328 that slides in slot 330 in the lower portion of trolley 308. Rotary operator 324 extends through a bore of side plate 326 that is attached to the outboard end of trolley 308. Operator 324 has a threaded end 332 that screws into a threaded bore of slide block 322 and an exposed head 334 at the outboard side of side plate 326. The rotary operator 324 carries a snap ring 336 on the inboard side of side plate 326 so that the rotary operator 324 is rotatable but fixed with respect to the side plate 326 in the longitudinal or axial direction when it rotates. Rotation of head 334 adjusts the two end positions of finger 318 when trolley 308 is translated by the two bar linkage described above.

Feed adjuster 321 is also designed for tactile adjustment. This is accomplished by a plurality of evenly spaced radial grooves 338 in the inboard face of head 334 and a spring loaded plunger 340 in the side plate 326 that is located to intercept the radial grooves so that there is a tactile feel and preferably an audible click when the spring loaded plunger 340 travels from one groove to the next. The feed adjuster is preferably designed so that there are six clicks per revolution and so that each click effects an adjustment of four-thousandths of an inch (0.004") in the axial or longitudinal direction.

The Guide and Brake Assembly

Referring now to FIGS. 2, 6, 6*a* and 6*b*, the guide and brake assembly 400 cooperates with the mechanical feed assembly 300 to feed terminals into the crimping area of the terminal assembly 118 for attachment to electric wires.

Guide and brake assembly 400 comprises a stock support plate 402 that is attached to the horizontal portion of base unit assembly 100 at one end. The support plate 402 has a raised platform 404 along one margin. A front guide 406 is attached to the adjacent edge so that the front guide 406 forms a thin horizontal slot 408 for the carrier strip A of the terminal strip S that connects the individual terminals T in a conventional manner. A rear guide 410 is attached to the top of the front guide 408 so that it overhangs the front guide 406 at the inboard side. A front hook rail 412 is attached to the inboard end of the front guide 408 and positioned in the transverse direction by spacer sleeves 414. The front hook rail 412 is typically disposed between the open U-shaped core and insulation crimp barrels B and C of the terminals T that are attached to the carrier strip A that is being pushed down the guide and brake assembly 400 toward the crimping area of terminal die assembly 18 by finger 318.

Figure 6:
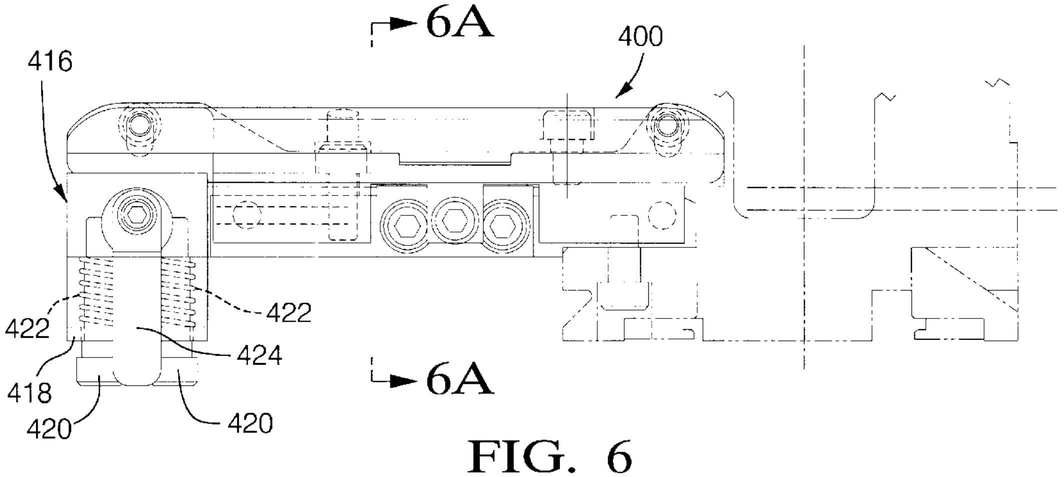
FIG. 6 is a front view of the guide and brake assembly shown in FIG. 2.
Figure 6A:
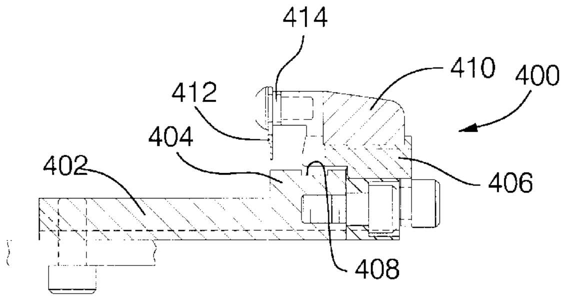
FIG. 6*a* is a section taken substantially along the line 6*a*—6*a* of FIG. 6 looking in the direction of the arrows.
Figure 6B:
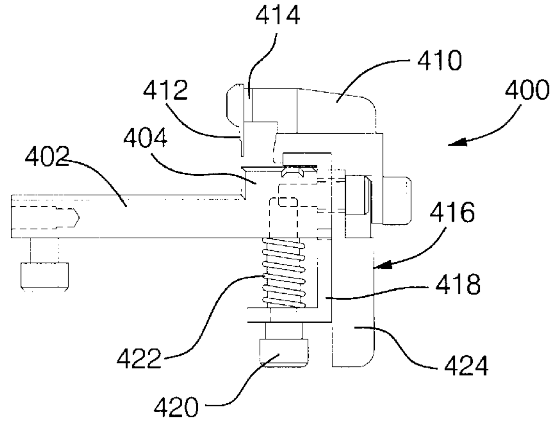
FIG. 6*b* is a side view of the guide and brake assembly shown in FIGS. 2 and 6.

Guide and brake assembly 400 includes a drag brake 416 that is located in front of front guide 406 adjacent the entrance of slot 408. Drag brake 416 engages carrier strip A of terminal strip S to prevent reverse travel. Drag brake 416 comprises a C-shaped shoe 418 that slides on two posts 420 that are attached to the bottom of support plate 402. Each post 420 is surrounded by a coil spring 422 that pushes shoe 418 down to engage platform 404. Shoe 418 is raised by a cam lever 424 that is pivotally mounted to the edge of support plate 402 with its cam portion disposed in a slot of shoe 418. The cam portion disengages from the slot when the cam lever 424 hangs down as shown in FIGS. 2, 6 and 6*a*. However, when the cam lever 424 is rotated 180 degrees to the raised vertical position, the cam portion engages the top of slot and raises shoe 418 away from platform 404 so that the carrier strip A can be passed under the upper flange of brake shoe 418 and inserted into slot 408. Cam lever 424 is then released so that shoe 418 biases carrier strip A against platform 404.

The guide and brake assembly 400 described above is configured for a particular terminal strip characterized by a single carrier strip. However it is well know that such assemblies can be configured for other types of terminals such as those with double carrier strips or wing type carrier strips. The same is true of the upper and lower tool pack assemblies 500 and 600 described below.

The Tool Pack Assemblies

Referring now to FIGS. 2, 7, 7*a* and 8, the tooling for crimping terminals T of terminal strip S to the ends of insulated electric wires comprises an upper tool pack assembly 500 and a lower tool pack assembly 600 that is matched to the upper tool pack assembly 500.

Figure 7:
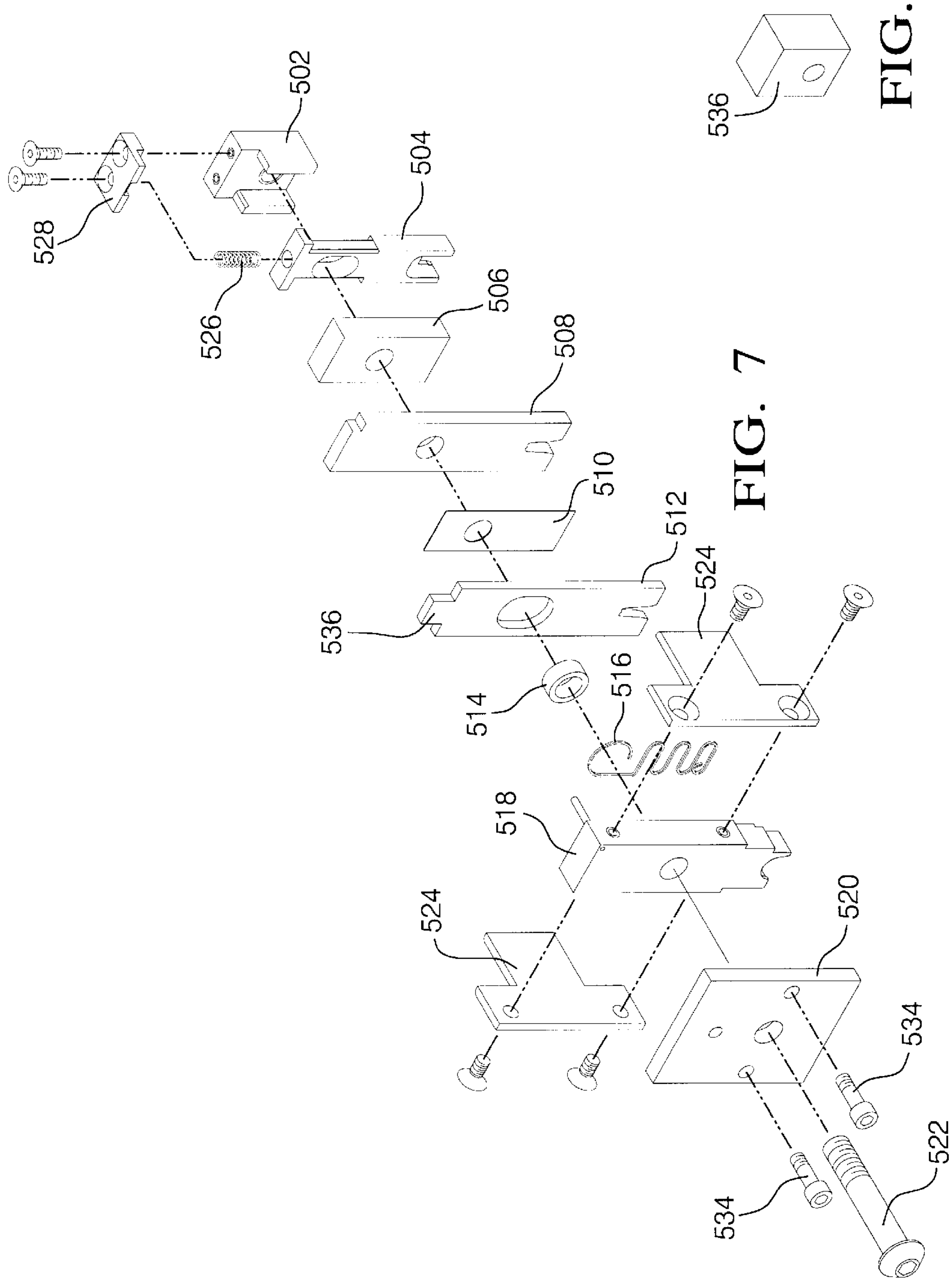
FIG. 7 is an exploded perspective view of the upper tool pack assembly shown in FIG. 2.

As best shown in FIG. 7 the upper tool pack assembly 500 includes a plurality of serially arranged components including a clamp block 502, pressure pad 504, spacer plate 506, core crimp plate 508, spacer plate 510, insulation crimp plate 512, spacer ring 514, wire depressor spring 516, front depressor 518 and clamp plate 520. Pressure pad 504, spacer plate 506, core crimp plate 508, spacer plate 510 insulation crimp plate 512, spacer ring 514 and front depressor 518 are sandwiched between the clamp block 520 and clamp plate 520 that are attached together by machine screw 522. Machine screw 522 has a smooth shank that passes through aligned holes in the clamp plate 520 and the sandwiched components and a threaded end that screws into the clamp block 502. Spacer plates 524 are attached to each side of front depressor 518.

Pressure pad 504 has an oval hole for machine screw 522 and moves vertically. It is biased downwardly by compression spring 526 that is retained by spring holder 528 that is secured to the top of clamp block 502. Insulation crimp plate 512 also moves vertically by virtue of an oval hole for machine screw 522. The vertical position of insulation crimp plate 512 is determined by insulation adjuster 214 as explained below. The upper end of wire depressor spring 516 hooks over spacer ring 514 that is partially disposed in the oval hole of crimp plate 512. The lower end of wire depressor spring 516 is visible in the notch in the lower end of front depressor 518 in the unstressed condition.

Figure 7A:
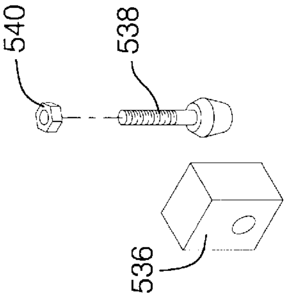
FIG. 7*a* is a perspective view of an alternate clamp block and pressure pad.

Upper tool pack assembly 500 is secured to slide retainer assembly 200 for vertical movement with the slide retainer assembly 200 by two machine screws 534 that pass through holes in clamp plate 520 and screw into threaded holes 213 opening into the face of retainer block 202. In an alternate arrangement clamp block 502 and pressure block 504 are replaced by clamp block 536 and pressure pad 538 (FIG. 7*a*). Pressure pad 538 screws into a central hole of optional keeper plate 276 (FIG. 4*c*) which is attached to the bottom of retainer block 202 by machine screws in the alternate arrangement. Jam nut 540 adjusts the hang length of the pressure pad 538.

When the upper tool pack assembly 500 is attached to slide retainer assembly 200, cam slot 282 engages cam follower 316 that operates mechanical feed assembly 300 as described above. Furthermore, insulation crimp plate 512 has a projecting tab 536 that engages strike pad 236 of insulation adjuster 214 which transfer the force of ram head 16 via the slide retainer assembly 200 as well as adjusts the vertical position of insulation crimp plate 512 with respect to slide retainer assembly 200. On the other hand the core crimp plate 508 is fixed and the vertical position for die closure is adjusted by positioning upper strike plate 222 by means of core adjuster 212. This also adjusts the vertical position of the insulation crimp plate 512 for die closure.

However the relative position of plates 508 and 512 are adjusted by adjuster 214.

Figure 8:
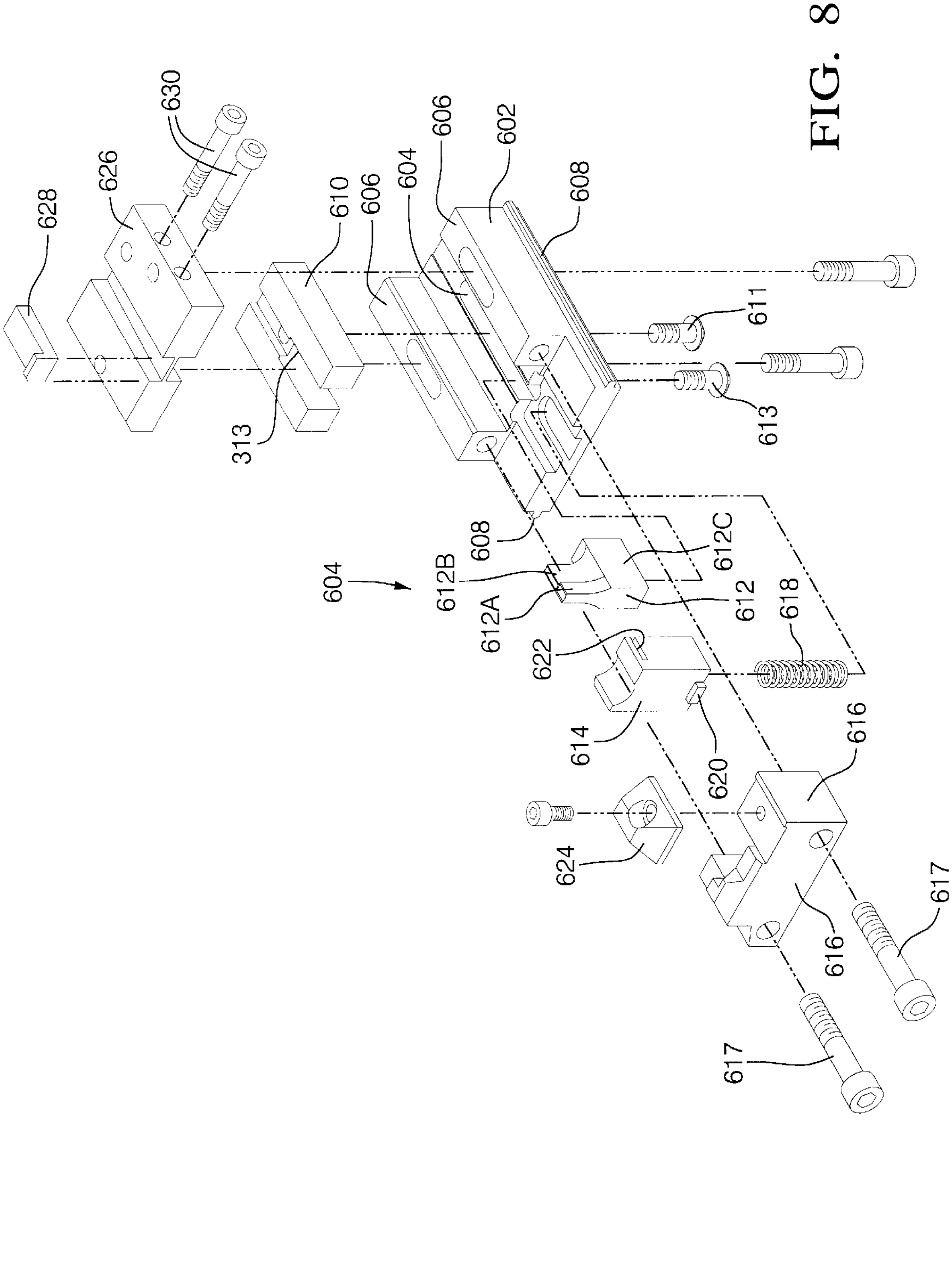
FIG. 8 is an exploded perspective view of the lower tool pack assembly shown in FIG. 2.

Referring now to FIG. 8, lower tool pack assembly 600 comprises die retainer 602 that has a central slot 604, raised side bars 606 on the rear portion and protruding side rails 608 for sliding the lower tool pack assembly 600 into the lower portion of the base unit assembly 100. Slotted spacer 610 fits between side bars 606 and is fastened to retainer 602 by machine screw 611. Lower tool pack assembly 600 further includes combination crimp anvil 612 that has insulation and core portions 612*a* and 612*b* and a base 612*c* that slides into the narrow rear portion of central slot 604 and slotted spacer 610. Base 612*c* abuts a stop shoulder 613 of spacer 610. Crimp anvil 612 is fastened to die retainer 602 by machine screw 613. A front lift-off punch 614 is held against anvil 612 by a punch retainer 616 that straddles lift off punch 614 and that is fastened to the respective faces of side bars 606 by two machine screws 617. The base of punch 614 slides vertically in an enlarged front portion of central slot 604 and is biased upwardly by a compression spring 618 that is disposed beneath the base of punch 614. Vertical movement is limited by a nib 620 that is disposed in a slot of the retainer 616. The upper portion of lift off punch 614 has a narrow horizontal slot 622 for the carrier strip A of terminal strip S. A cut-off insert 624 is attached to the top of the punch retainer 616. The lower tool pack assembly 600 also includes a retainer 626 that is fastened to the top of side bars 606 by machine screws. Retainer 626 retains a support block 628 that slides in a groove in the top of retainer 626 and is held in an adjusted position by set screw 630.

Lower tool pack assembly 600 is secured to the lower portion 104 of base unit assembly 100 by sliding die retainer 602 into tracks 113 and clamping assembly 600 in place with clamp plate 114.

Upper tool pack assembly 500 and lower tool pack assembly 600 are typical of European type crimp tooling. As mentioned above, the tool pack assemblies 500 and 600 are specifically designed for a particular type of terminal strip that has a particular carrier strip and crimp barrel arrangement.

One of the features of the terminal assembly die of this invention is that the terminal assembly die 18 is extremely versatile in accommodating different types of terminals and different types of tooling which can be accomplished simply by changing the upper and lower tool pack assemblies 500 and 600.

OPERATION

The terminal assembly die 18 operates as follows. Terminal strip S (FIG. 2) is loaded into guide and brake assembly 400 by lifting the drag brake 418, inserting the front end of the carrier strip A into slot 408 (FIGS. 6 and 6*a*) and advancing the terminal strip S until the carrier strip A is threaded into slot 622 of lift-off punch 614 (FIG. 8) and the open insulation and core crimp barrels B and C of the load terminal T lie on anvil 612. With ram head 16 raised, an insulated electric wire with a bare core end is then fed longitudinally into the front end of the terminal assembly die 18 between the upper and lower tool pack assemblies 500 and 600 so that the insulated electric wire rests on lift-off punch 614 and an insulated portion and the bare core lie on the open insulation and crimp barrels B and C respectively. Ram head 16 is then lowered. As ram head 16 descends, the insulated electric wire is engaged and held down on lift-off punch 614 by wire depressor spring 516. As cam head 16 descends further the insulated electric wire and the contact E of the lead terminal are clamped down onto the lift-off punch 614 and die support block 628 by front depressor 518 and clamp block 504. Crimp plates 512 and 508 then engage the open insulation and core crimp barrels B and C and deform the crimp barrels B and C tightly around the insulated portion and bare core end in well known manner. As the terminal assembly die 18 moves to the fully closed position, front depressor 518 depresses the front lift-off punch 614 severing the lead terminal T from the carrier strip A and cutting the end of the carrier strip A off Ram head 16 is then returned to the raised position for the next cycle. As ram head 16 raises, cam plate 530 swings cam follower 316 and link 312 counterclockwise translating finger 318 toward lower tool pack assembly 600 and advancing the terminal strip S so that the next terminal T is in place for the next cycle. When ram head 16 descends during the next cycle, finger 318 is translated away from lower tool pack assembly 600. However, the terminal strip S does not travel in reverse direction because pivotally mounted finger 318 is cammed over the terminal strip portions in its path and the drag brake 418 holds the terminal strip S against reverse travel.

Press Adaptations

Figure 9:
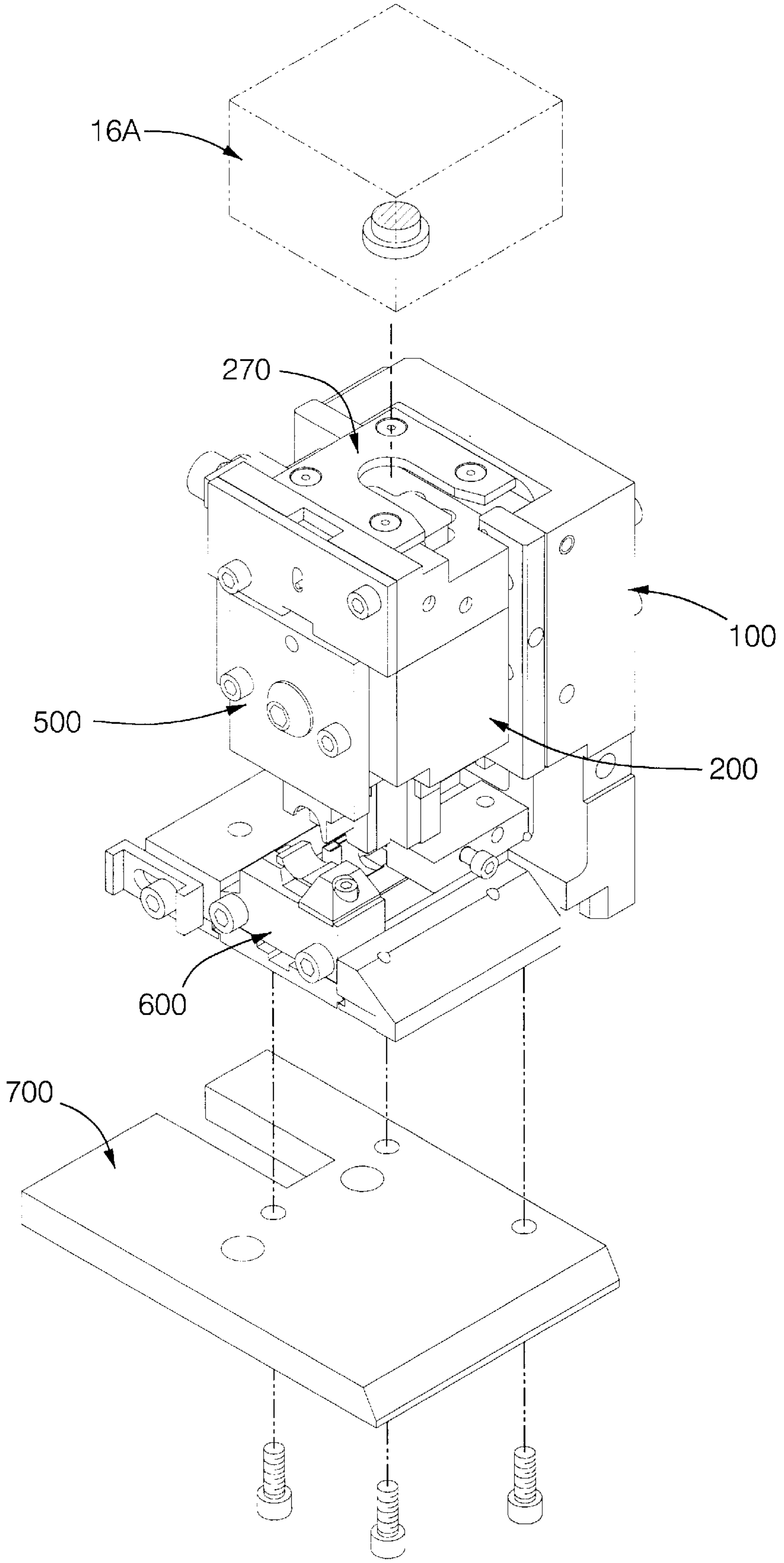
FIG. 9 is a fragmentary, exploded perspective view of the terminal assembly die shown in FIG. 2 adopted and installed in a different press.

The terminal assembly die 18 described above is configured for European style presses. However, the terminal assembly die 18 can be adapted to Asian Pacific style presses that are characterized by a button on the bottom of the ram head as shown in FIG. 9. These presses are also characterized by a higher wire line L (1.450" in comparison to 1.083") and a shorter shut height (4.700" in comparison to 5.346"). The shut height is the distance from the strike point in the slide retainer assembly 200 to the bottom surface of the base unit assembly 100 in the fully closed position. The strike point is the top surface of strike pad 222 (FIG. 4). The distance to the bottom surface of base unit assembly 100 includes the thickness of any spacer plate attached to the bottom of base unit assembly 100.

In order to accommodate the differences noted above, adapter 250 is removed from slide retainer assembly 200 and the slide retainer assembly 200 is attached to ram head 16A by plate 270. The removal of adapter 250 places the slide retainer assembly 200 closer to the ram head 16A and thus accommodates the shorter shut height. However, in order to accommodate the higher wire line L, a space plate 700 is attached to the bottom of the base unit assembly 100 by three machine screws.

Figure 10:
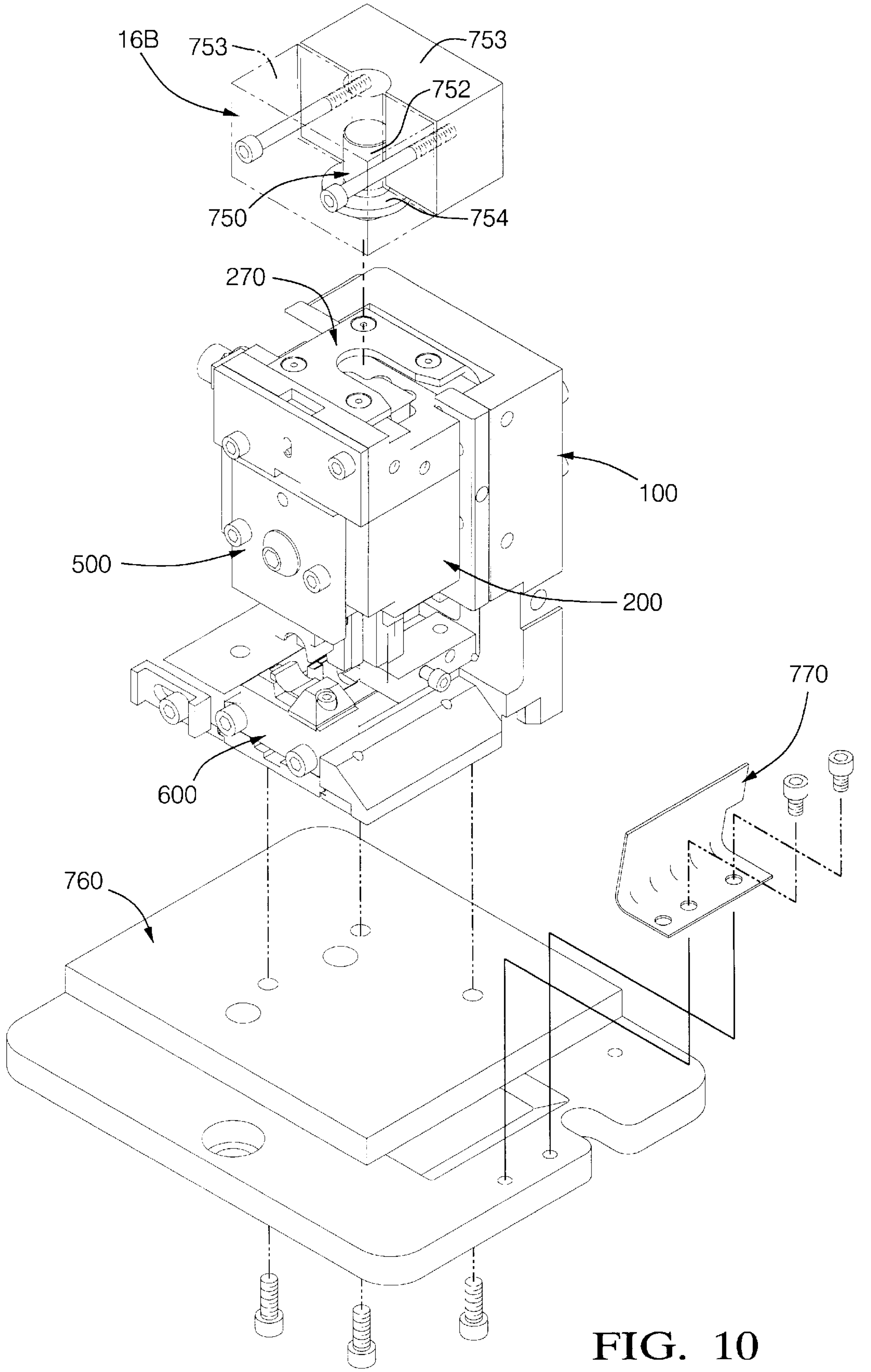
FIG. 10 is a fragmentary, exploded perspective view of the terminal assembly die shown in FIG. 2 adapted and installed in another different press.

Terminal assembly die 18 can also be adapted to the North American type press such as the assignees Speed-O-Matic press that is characterized by a bore in the ram head 16B as shown in FIG. 10. These presses are also characterized by a somewhat higher wire line L (1.125" in comparison to 1.083") and a somewhat shorter shut height (5.125" in comparison to 5.346").

In order to accommodate these differences in the North American press, adapter 250 is removed from slide retainer assembly 200 and replaced by adapter 750 comprising an upper shank 752 that fits into the bore of ram head 16B and locked in place by compression blocks 753 that form the bore so that flange 754 that fits beneath plate 270 or optional plates 272 of slide retainer assembly 200. The replacement of adapter 250 with adapter 750 places the slide retainer assembly 200 closer to the ram head 16B and thus accommodates the somewhat shorter shut height. However, in order to accommodate the higher wire line L, a spacer plate 760 is attached to the bottom of the base unit assembly 100 by three machine screws. Spacer plate 760 may also include a scrap guard 770 for manual feed as explained below.

Tooling Accommodations

The terminal assembly die 18 described above is configured for European style tooling. However, the terminal assembly die 18 can be adapted to Asian Pacific and North American style tooling by replacing slide retainer assembly 200, upper tool pack assembly 500 and lower tool pack assembly 600.

Figure 11:
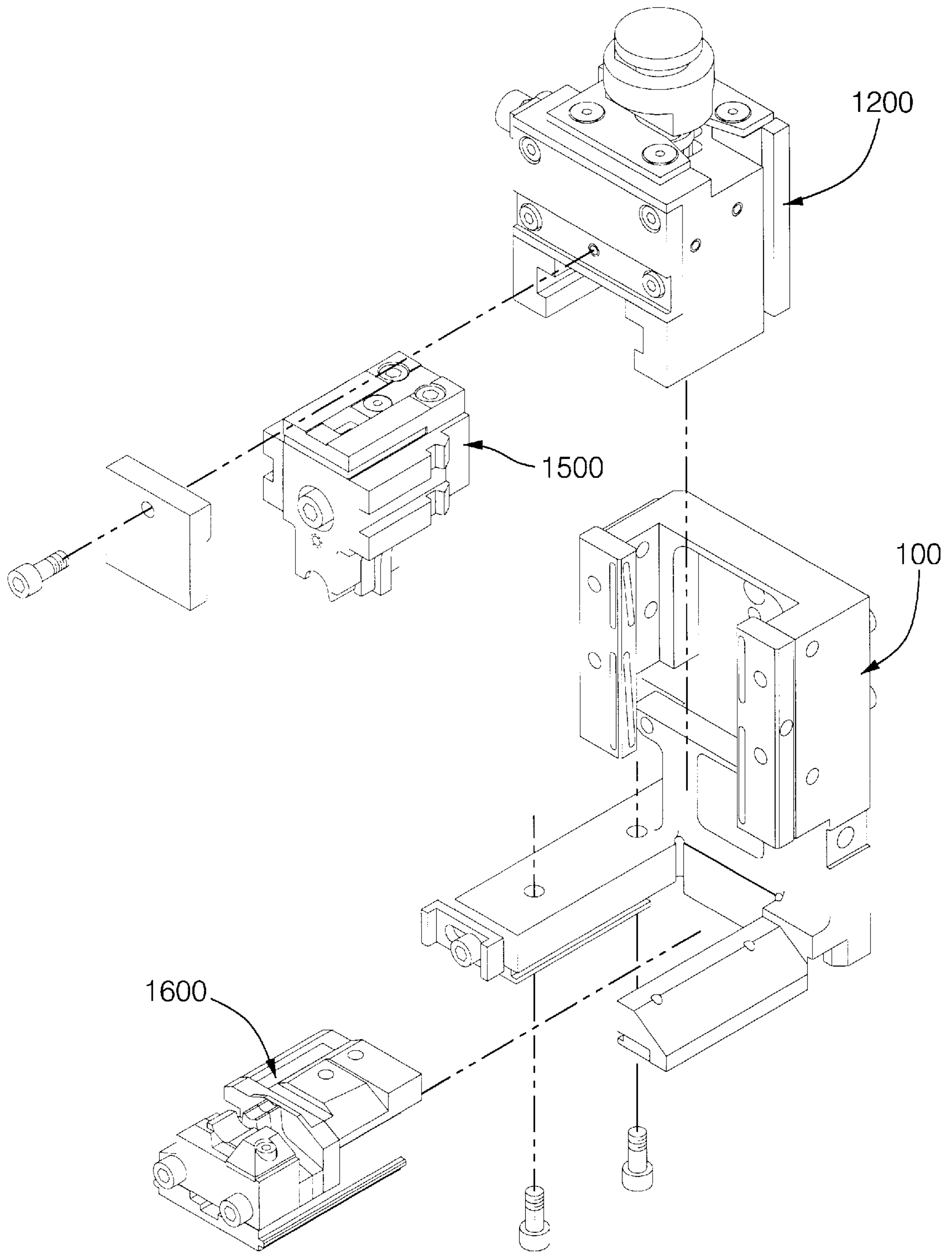
FIG. 11 is an exploded perspective view of an alternate terminal assembly die having common components with the terminal assembly die shown in FIGS. 1 through 8.

Referring now to FIG. 11, terminal assembly die 18 now comprises base unit assembly 100 with slide retainer assembly 1200 in place of slide retainer assembly 200 upper tool pack assembly 1500 in place of upper tool pack assembly 500 and lower tool pack assembly 1600 in place of lower tool pack assembly 600. Mechanical feed assembly 300 and guide and brake assembly 400 have been omitted for simplicity.

Figure 12:
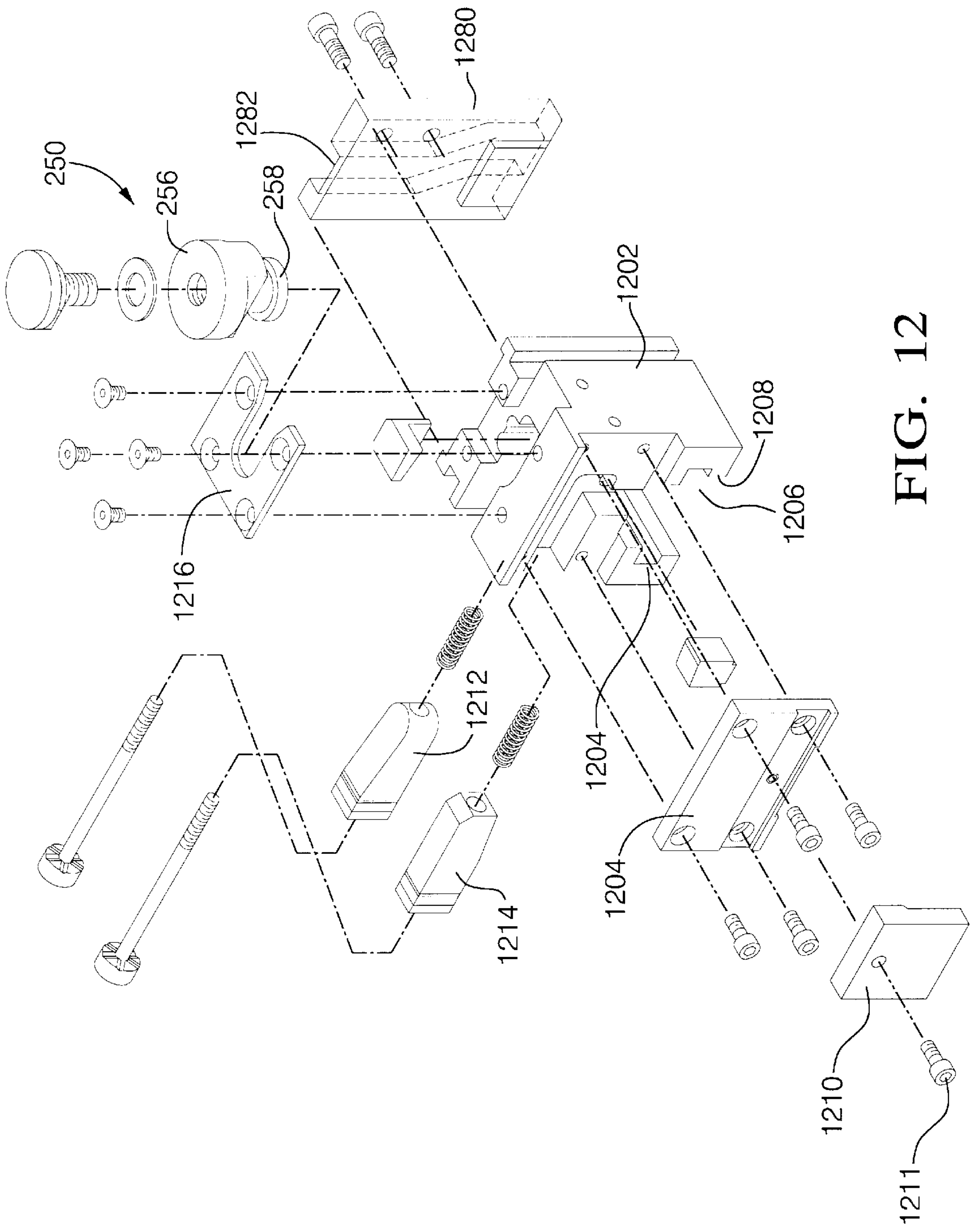
FIG. 12 is an exploded perspective view of the slide retainer assembly that is shown in FIG. 11.

Referring now to FIGS. 11 and 12, the slide retainer assembly 1200 is attached to the ram head 16 so that it reciprocates in the base unit assembly 100 as ram head 16 is raised and lowered. Slide retainer assembly 1200 holds upper tool pack assembly 1500 and moves upper tool pack assembly 1500 toward the lower tool pack assembly 1600 retained in the horizontal member 104 of the base unit assembly 100 to close the die when the ram head 16 is lowered.

Slide retainer assembly 1200 comprises a retainer block 1202 and cover plate 1204. Retainer block 1202 has a cavity 1206 beneath cover plate 1204 that defines side rails 1208 for sliding the upper tool pack assembly 1500 into the cavity 1206. The upper tool pack assembly 500 is retained by clamp plate 1210 that is secured to cover plate 1204 by machine screw 1211.

The retainer block 1202 has a core adjuster 1212 and an insulation adjuster 1214 for adjusting the position of the core and insulation crimping plates in the upper tool pack assembly 1500 that are substantially identical to core adjuster 212 and insulation adjuster 214 described above. Adjusters 1212 and 1214 also operate in the same way.

Slide retainer assembly 1200 has the removable adapter 250 described above for connecting the slide retainer assembly to the ram head 16 when the ram head 16 is of the European type characterized by a slotted head as shown in FIG. 1. Shank 260 is inserted into a slot of a clamp plate 1216 that is attached to the upper end of the slide retainer assembly 1200 so that the clamp plate 1216 is loosely retained between the upper body 256 and the lower head 258. Clamp plate 1216 is substantially identical to clamp plate 270 described above, and clamp plates 272 (FIG. 4*c*) may be used in place of clamp plate 1216.

Slide retainer assembly 1200 also includes cam plate 1280 with cam slot 1282 for operating the mechanical feed assembly 300.

Figure 13:
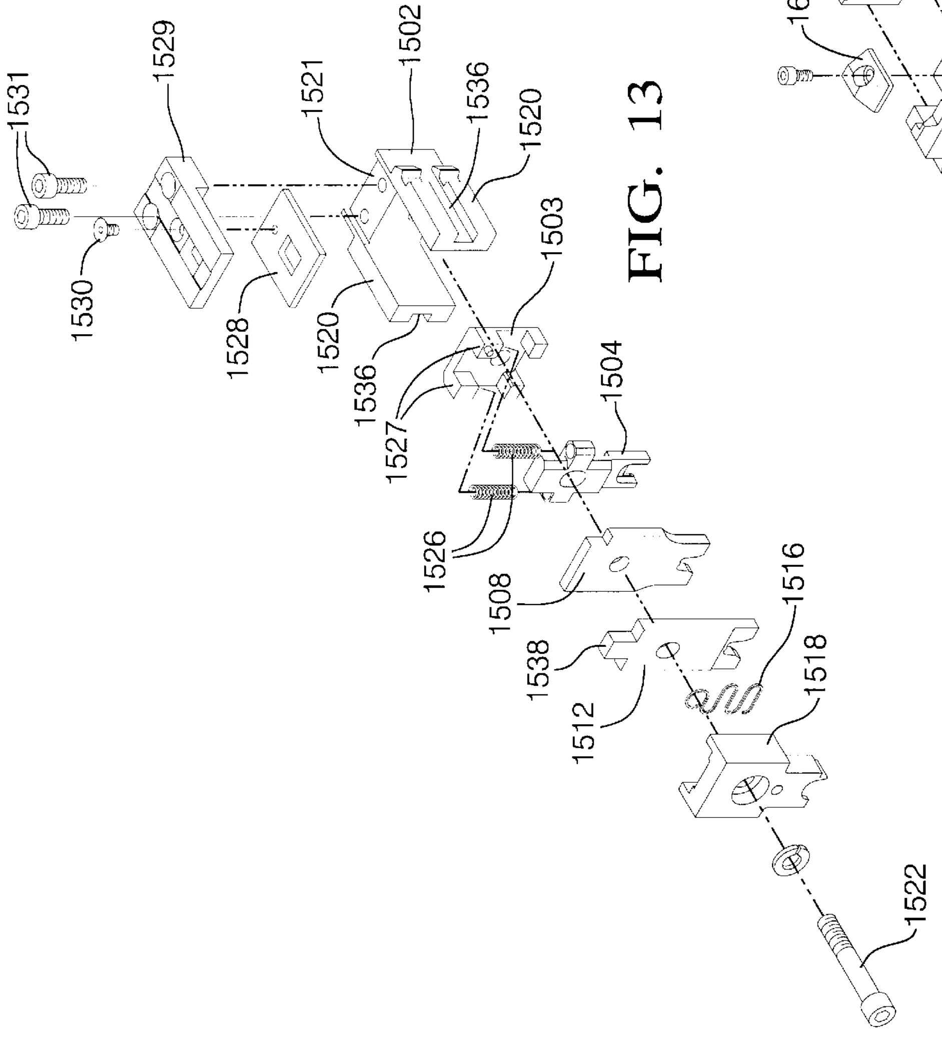
FIG. 13 is an exploded perspective view of the upper tool pack assembly that is shown in FIG. 11.

Referring now to FIGS. 11 and 13 the upper tool pack assembly 1500 includes a plurality of serially arranged components including a U-shaped clamp block 1502, spacer plate 1503, pressure pad 1504, core crimp plate 1508, insulation crimp plate 1512, wire depressor spring 1516 and front depressor 1518. Spacer plate 1503, pressure pad 1504, core crimp plate 1508, insulation crimp plate 1512, wire depressor spring 1516 and front depressor 1518 fit between the side walls 1520 of clamp block 1502 and are clamped against back wall 1521 by machine screw 1522. Machine screw 1522 has a smooth shank that passes through aligned holes in the front depressor 1518. Components sandwiched between front depressor 418 and back wall 1521 and a threaded end that screws into the back wall 1521 of block 502.

Pressure pad 1504 has an oval hole for machine screw 1522 and moves vertically. It is biased downwardly by compression spring 1526 that react against upper stops 1527 of spacer plate 1503. The top of claim block 1502 is covered by set-up plate 1528 and insect holder 1529 that are attached to each other by machine screw 1530 and to the block 1502 by machine screws 1531. Insulation crimp plate 1512 adjusts vertically by virtue of an oval hole for machine screw

1522 and insulation adjuster 1214 as described above. The upper end of wire depressor spring 1516 hooks over the smooth shank of machine screw 1522 and the lower end is visible in the notch in the lower end of front depressor 1518.

Upper tool pack assembly 1500 is secured to slide retainer assembly 1200 for vertical movement with the slide retainer assembly 1200 by tracks 1536 in side walls 1520 that slide onto rails 1208 of retainer block 1202 and screw 1211 that passes through a hole in clamp plate 1210 and screws into a threaded hole opening into the face of the cover plate 1204 of retainer block 1202.

When the upper tool pack assembly 1500 is attached to slide retainer assembly 1200, cam slot 1534 that engages the stroke pad of insulation adjuster 1214 which operates as well as adjusts so that the vertical position of insulation crimp plates 1512 with respect to slide retainer assembly 1200 and the fixed core crimp plate 1508. The vertical positions of the fixed core crimp plate 1508 and the adjusted insulation crimp plate 1512 are further adjusted for die closure by positioning the upper strike plate by means of core adjuster 1212.

Figure 14:
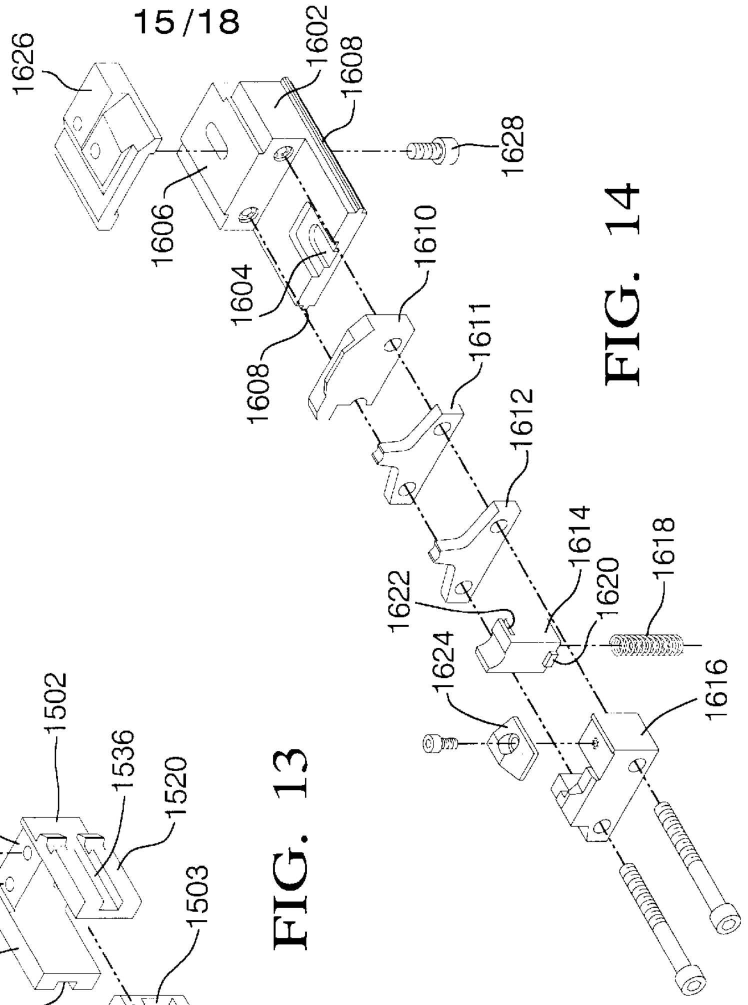
FIG. 14 is an exploded perspective view of the lower tool pack assembly that is shown in FIG. 11.

Referring now to FIGS. 11 and 14, lower tool pack assembly 1600 comprises die retainer 1602 that has a central slot 1604, raised rear platform 1606 and protruding side rails 1608 for sliding the lower tool pack assembly 1600 into the lower portion of the base unit assembly 100. Spacer 1610 fits against platform 1606 and serves as a stop for core anvil 1611 and insulation anvil 1612 that are supported on the forward portion of retainer 1602. Spacer 1610 and anvils 1611 and 1612 are held against platform 1606 by a punch retainer 1616 that is fastened to the platform 1606 by two machine screws. Punch retainer 1616 straddles a front lift, cut-off punch 1614 having a base that slides vertically in an enlarged portion of central slot 1604. Punch 1614 is biased upwardly by a compression spring 1618 that is disposed beneath the base of punch 1614. Vertical movement is limited by a nib 1620 that is disposed in a slot of the punch retainer 1616. The upper portion of punch 1614 has a narrow horizontal slot 1622 for the carrier strip A of terminal strip S. A cut-off insert 1624 is attached to the top of the punch retainer 1616. The lower tool pack assembly 1600 also includes a support plate 1626 that is fastened to the top of platform 1606. By machine screws. Support plate 1626 that slides on sides groove in the top of platform 1606 and is held in an adjusted position by machine screw 1628. Support plate 1626 supports to an adjustable wire stop for a manual feed assembly described below.

Lower tool pack assembly 1600 is secured to the lower portion 104 of base unit assembly 100 by sliding die retainer 1602 into tracks 113 and clamping assembly 1600 in place with clamp plate 114.

Upper tool pack assembly 1500 and lower tool pack assembly 1600 are typical of North American type crimp tooling.

The modified terminal assembly die 18 described above is configured for European style presses even though tooling is typical of North American-type tooling. However, the modified terminal assembly die 18 can be adapted to Asian Pacific and North American style presses by elimination or replacing adapter 250 as indicated above.

Optional Pneumatic Feed Assembly

Terminal assembly die 18 is also versatile with respect to feed assemblies. Mechanical feed assembly 300 of the terminal assembly die 18 shown in FIG. 2 may be replaced by a pneumatic feed system comprising pneumatic feed assembly 1300, valve assembly 1300V, and cam assembly 1300C as shown in FIGS. 15 and 16.

Figure 15:
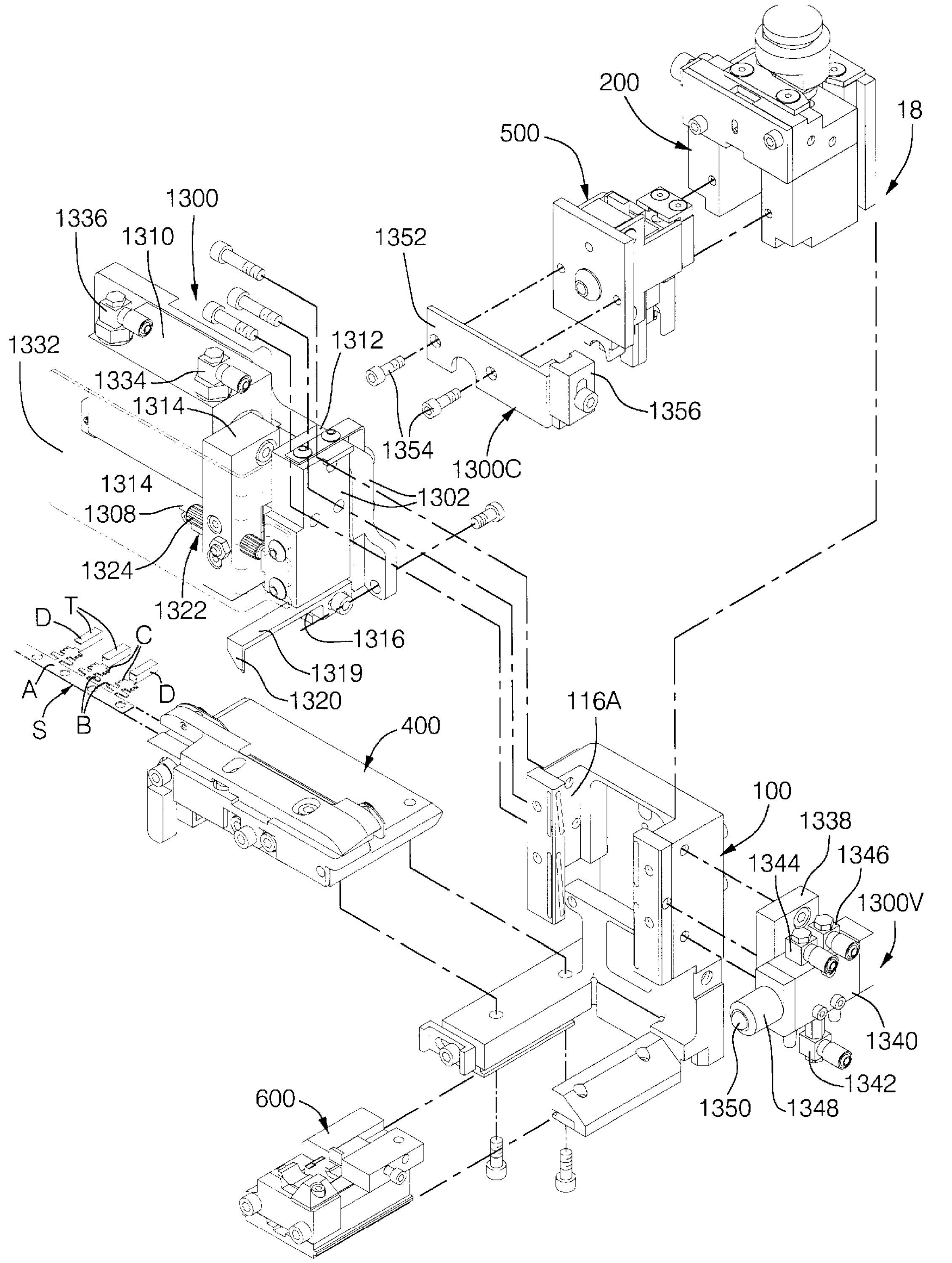
FIG. 15 is a perspective view of another optional terminal assembly die equipped with an air feed assembly.
Figure 16:
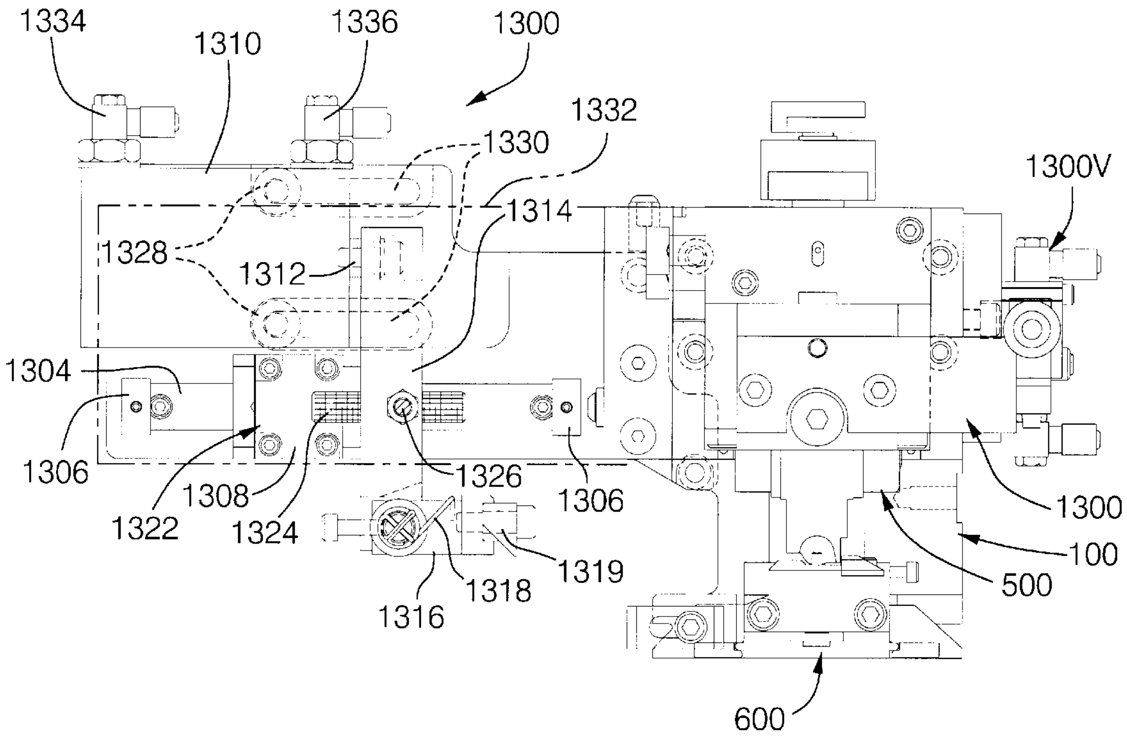
FIG. 16 is a front view of the air feed assembly shown in FIG. 15.

Referring now to FIGS. 15 and 16, the pneumatic feed assembly 1300 feeds terminal strip S from a conventional supply reel (not shown) through guide and brake assembly 400 to the crimp area of the modified terminal assembly die 18 that is between the upper and lower tool pack assemblies 500 and 600 in a coordinated fashion.

Pneumatic feed assembly 1300 comprises a two piece bracket 1302 that is fastened to the side 116*a* of the base unit assembly 100 by machine screws. Horizontal rail 1304 is attached to the face plate of the bracket 1302 and equipped with end stops 1306. A trolley 1308 slides on rail 1304. Trolley 1308 is driven by pneumatic motor 1310 comprising a piston that slides in a cylinder and a piston rod 1312 that is attached to the piston. Piston rod 1312 extends out the near side of pneumatic motor 1310. The free end of piston rod 312 is attached to a vertical end plate 1314 that is part of trolley 1308. A short pivot arm 1316 is attached to the bottom of end plate 1314 by a stationary pivot pin 1317 at one end. Torsion spring 1318 has its opposite ends attached to the stationery pivot pin 1317 and the pivot arm 1316 respectively, so that the pivot arm 1316 is spring biased in the clockwise direction to a horizontal position extending toward base unit assembly 100 and tool pack assemblies 500 and 600 as shown in FIG. 16.

Feed finger 1319 is attached to the opposite end of pivot arm 1316 in cantilever fashion. Feed finger 1319 extends forwardly over the guide and brake assembly 400 and terminates in a downward tip 1320. Tip 1320 cooperates with the guide and brake assembly 400 to advance the terminal strip S through the guide and brake assembly 400 to the crimping area of the modified terminal assembly die 18 between upper and lower tool pack assemblies 500.

Figure 16A:
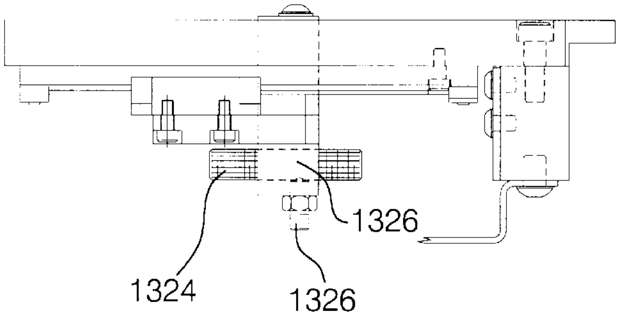
FIG. 16*a* is a section taken substantially along the line 16*a*—16*a* of FIG. 16 looking in the direction of the arrows.

The end plate 1314 forming part of trolley 1308 carries an adjustable stop 1322 that engages frame 1302 to limit the advance of the feed finger 1319 toward base unit assembly 100 and the tool pack assemblies 500 and 600 by pneumatic motor 1310. Adjustable stop 1322 comprises a rotary operator 1324 having external threads that are cut by a plurality of longitudinal grooves that are equally spaced in the circumferential direction so that the rotary operator 1324 has a tap like appearance. The rotary operator 1324 is screwed through a threaded hole that extends through the end plate 1314 so that portions project from each side of the end plate 1314. This provides a handle portion on the far side of the end plate 1314 for rotating operator 1324 and a stub on the near side of end plate 1314 for engaging frame 1302. End plate 1314 contains a conventional spring biased plunger 1326 (FIG. 16*a*) that is located to intersect the longitudinal grooves of the rotary operator 1324 inside the end plate 1314 so that there is a tactile feel and preferably an audible click when the spring loaded plunger 1326 travels from one groove to the next. The adjustable stop 1322 is preferably designed so that there are ten clicks per revolution and so that each click effects an adjustment of four-thousandths of an inch (0.004") in the axial or longitudinal direction. Thus the mechanical and pneumatic feed adjusters have the same axial adjustment per revolution.

Pneumatic motor 1310 is attached to frame 1302 by two slide pins 1328 (with lock nuts) that slide in two parallel slots 1330 in the upper portion of the back plate of frame 1302. The travel or translation of trolley 1308 is limited at the far end by the adjusting the position of pneumatic motor 1310 on frame 1302 via the two slide pins 1328. The travel of trolley is limited at the end by rotating operator to adjust the protrusion of the stub portion of adjustable stop 1322 that engages frame 1302.

Assembly 1300 also includes a removable front guard plate 1332 that covers the adjustable stop and the moving parts of assembly 1300.

Pneumatic motor 1310 has two chambers on the opposite sides of an internal piston that communicates with fittings 1334 and 1336 respectively for connecting the chambers to fittings of the valve assembly 1300V with hoses.

Valve assembly 1300V comprises a back-up plate 1338 that is attached to side 116*b* of base unit assembly 100 and a valve 1340 that is attached to back-up plate 1338. Valve 1340 has an inlet fitting 1342 that is attached to a pneumatic pressure source (not shown) by a hose, two outlet fittings 1344 and 1346 that are attached to the respective fittings 1334 and 1336 of motor 1310 respectively by hoses and an exhaust port 1348 that is closed by a spring loaded check valve ball 1350. Valve unit 1300V is a commercially available four-way ported, mechanically actuated with air bleed assist valve that operates in a well known manner to change the direction of air flow to the pneumatic motor 1310.

Cam assembly 1300C comprises a support plate 1352 that is attached to the upper tool pack 500 by machine screws 1354 and a vertically adjustable cam 1356 that is attached to the end of the support plate 1352.

The pneumatic feed system operates in the following manner. When ram head 16 raises slide retainer assembly 200 from the die closed position shown in FIG. 1, cam 1356 rises along with upper tool pack assembly 500 and the slide retainer assembly 200 and disengages from ball 1300 closing exhaust port 1348. Air under pressure is then fed to the chamber on the far side of pneumatic motor 1310 through fitting 1336 causing trolley 1308 and finger 1319 to move forward toward base unit assembly 100 and the crimping tools until stop assembly 1322 engages frame 1302. During this forward movement, the finger tip 1320 engages terminal strip S and advances the lead terminal T into a crimping position where the open insulation and core crimp barrels are properly positioned in the crimping tools for the crimping operation on the down stroke. When ram head 16 descends for the crimping operation, the trolley 1308 and feed finger 1316 are initially maintained in the forward position by pneumatic pressure in motor 1310. However, as the slide retainer assembly 200 and the upper tool pack assembly 500 approach die closure and initiate the crimping operation, cam 1356 engages ball 1350 opening exhaust valve 1348. This relieves pressure in the far chamber and the motor returns trolley and finger to the starting position for the next cycle.

Optional Manual Wire Feed

The terminal assembly die 18, whether mechanically or pneumatically fed with terminals can be used in conjunction with wire cutters that automatically cut the proper length of insulated electric wire, prepare the end of the insulated electric wire for termination, feed the prepared end into the terminal applicator, actuate the ram head to apply the terminal to the prepared end, withdraw the terminate electric wire, and keep repeating the cycle. Such cutters are well known in the art and are commonly used in high production runs.

Figure 17:
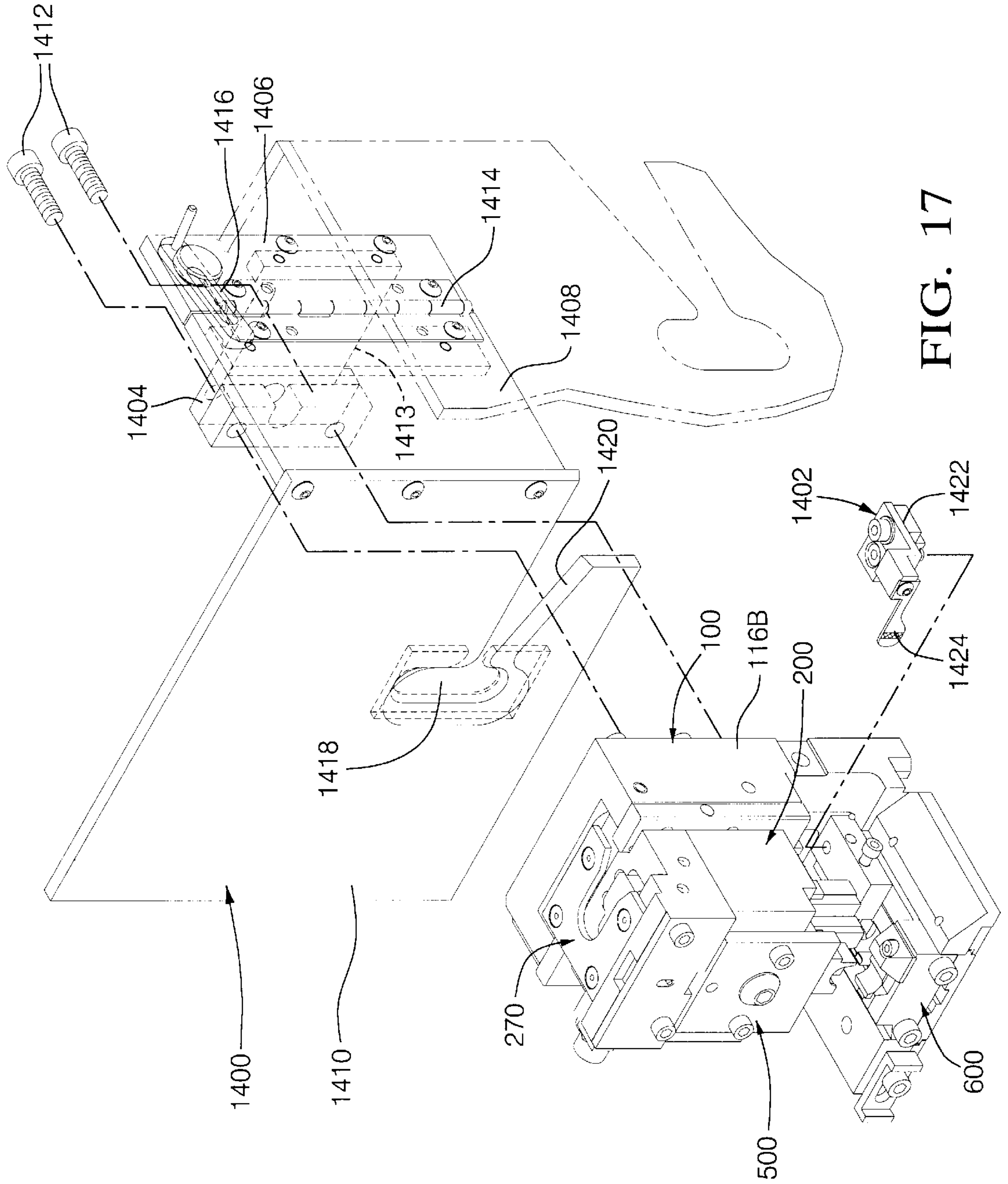
FIG. 17 is an exploded perspective view of another terminal assembly die equipped with a manual feed.

However, the terminal assembly die 18 shown in FIG. 2 is also adaptable for use in terminal applicators for short or low production runs by incorporating a manual feed system. Referring now to FIGS. 17, the manual feed system comprises a guard assembly 1400 and an adjustable wire stop assembly 1402.

Guard assembly 1400 comprises back plate 1404, side plate 1406, hinge plate 1408 and front plate 1410. Back plate 1404 is attached to the back of base unit assembly 100 at the upper end of vertical member 102 by machine screws 1412.

A stop plate 1413 is attached to the side 116*b* of base unit assembly 100. Hinge plate 1408 is attached to side plate 1406 by hinge 1414 that is located in the middle of side 116*b* when back plate 1404 is attached to the base unit assembly 100. Guard assembly 1400 also includes a closure latch 1416 that fixes hinge plate 1408 against stop plate 1413 that is attached to the forward portion of side 116*b*. With the parts in this position, front plate 1410 is positioned in front of slide retainer assembly 200 and the upper and lower tool pack assemblies 500 and 600 that are attached to the base unit assembly 100 as shown in FIG. 2. Front plate 1410 has a window 1418 that provides access to the crimping area of the tool pack assemblies 500 and 600 that is between the anvil of lower tool pack assembly 600 and the crimp plates of the upper tool pack assembly 500. Front plate 1410 also has a slot 1420 that extends from window 1418 to an to the lower right hand comer of front plate 1410. Thus electric wires may be inserted into the tooling area and/or withdrawn through the window 1418 in the axial direction and/or in the lateral direction using the slot 1420 in conjunction with the window 1418.

The adjustable wire stop assembly 1402 comprises a support 1422 and a traverse finger 1424 that is attached to the end of the support 1422. The support 1422 is attached to the insert block 626 of the lower tool pack assembly 600 (FIG. 8) and adjusted so the electric wire is inserted into the crimping area of the tooling at the proper depth when the end of the electric wire engages finger 1424.

The hinge plate 1408 and the front plate 1410 are conveniently hinge connected to side plate 1406 so that the hinge plate 1408 and front plate 1406 can be swung back out of the way as shown in phantom in order to change tool pack assemblies 500 and 600 for other terminal configurations and other types of terminals. It should be noted that tool pack assemblies such as the tool pack assemblies 1500 and 1600 may be used with the manual feed assembly and that the terminal assembly die can be adapted for other presses by eliminating or replacing adapter 250 (not shown) and including base plates 700 or 760 as shown in FIGS. 9 and 10. As indicated in connection with FIG. 10, the manual feed assembly may include scrap guard 770 that is attached to the base plate 760.

The terminal assembly die of this invention is extremely versatile and adaptable to a variety of presses and situations as demonstrated above. Obviously, many modifications and variations of the present invention in light of the above teachings may be made. It is, therefore, to be understood that, within the scope of the appended claims, the invention may be practiced otherwise than as specifically described.

We claim:

1. A modular terminal assembly die for installation in a press having a bed and a ram head that moves vertically toward and away from the bed, the terminal assembly die comprising:

a base unit assembly that has means for clamping the base unit to a bed of a press, a central slot and confronting tracks on the opposite sides of the central slot that slideably receives a lower tool pack assembly secured to the base unit, the base unit assembly having a vertical member having an upper vertical slide that slideably receives a slide retainer assembly, the slide retainer assembly having means for attaching the slide retainer assembly to a ram head of the press, an upper tool pack assembly secured to the slide retainer assembly, and the base unit assembly having portions for attaching auxiliary assemblies and for attaching a guide and brake assembly to the base unit assembly for advancing terminals to a crimping position between the upper and lower tool pack assemblies or a guard assembly for feeding terminals to the crimp position manually.

2. The terminal assembly die as defined in claim 1 wherein the portion for attaching a feed mechanism is a side wall of the upper portion of the vertical member, the slide is partially defined by a wall that has a recess that communicates with a slot through the side wall, and the feed assembly has drive components disposed in the slot and the recess, and the slide retainer assembly has a replaceable cam plate for operating the drive components of the feed assembly.

3. A modular terminal assembly die for installation in a press having a bed and a ram head that moves vertically toward and away from the bed, the terminal assembly die comprising:

a base unit assembly that has means for clamping the base unit to a bed of a press, a central slot and confronting tracks on the opposite sides of the central slot that slideably receives a lower tool pack assembly secured to the base unit, the base unit assembly having a vertical member having an upper vertical slide that slideably receives a slide retainer assembly, the slide retainer assembly having means for attaching the slide retainer assembly to a ram head of the press, an upper tool pack assembly secured to the slide retainer assembly, and the base unit assembly having portions for attaching auxiliary assemblies and for attaching a guide and brake assembly to the base unit assembly for advancing terminals to a crimping position between the upper and lower tool pack assemblies or a guard assembly for feeding terminals to the crimp position manually, the feed assembly including a fluid motor and a control valve that is operated by a cam of the slide retainer assembly.

4. A terminal assembly die for installation in a press having a bed and a ram head that moves vertically toward and away from the bed, the terminal assembly die comprising:

a base unit assembly and a slide retainer assembly that receives an upper tool pack assembly, the base unit assembly being generally L-shaped and having horizontal and vertical members, the horizontal member having means for clamping the base unit to a bed of a press, a central slot and confronting tracks on the opposite sides of the central slot for receiving a lower tool pack assembly; and the vertical member having an upper portion that is generally U-shaped in cross section to provide spaced side portions that provide a vertical slide that receives the slide retainer assembly, and portions for attaching a feed assembly and for attaching a guide and brake mechanism to advance terminal to a crimping position beneath the upper portion of the vertical member, the slide retainer assembly having a cam for operating the feed assembly.

5. A terminal assembly die for installation in a press having a bed and a ram head that moves vertically toward and away from the bed, the terminal assembly die comprising:

a base unit assembly that is generally L-shaped and has horizontal and vertical members, the horizontal member having means for clamping the base unit to a bed of a press, a central slot and confronting tracks on the opposite sides of the central slot for receiving a lower tool pack assembly;

a removable plate attached to the horizontal member for clamping the base unit to a bed of a different press, the vertical member having an upper portion that is generally U-shaped in cross section to provide spaced side portions that provide a vertical slide that receives a slide retainer assembly, and the slide retainer assembly having a plate for attaching the slide retainer assembly to a ram head of the press, and a removable adapter for attaching the slide retainer assembly to a differently configured ram head.

6. The terminal assembly die as defined in claim 5 wherein the removable adapter comprises a shank piece and a connecting rod, the shank piece having an enlarged upper body connected to a lower head by a shank, the connecting rod having an upper head and a shank that is threaded at a lower end, the connecting rod being screwed into the shank piece to clamp to adapter to the ram head.

7. A terminal assembly die for installation in a press having a bed and a ram head that moves vertically toward and away from the bed, the terminal assembly die comprising:

a base unit assembly that is generally L-shaped and has horizontal and vertical members, the horizontal member having means for clamping the base unit to a bed of a press, a central slot and confronting tracks on the opposite sides of the central slot for receiving a lower tool pack assembly;

a removable plate attached to the horizontal member for clamping the base unit to a bed of a different press, the vertical member having an upper portion that is generally U-shaped in cross section to provide spaced side portions that provide a vertical slide that receives a slide retainer assembly, and the slide retainer assembly having a plate for attaching the slide retainer to a ram head of the press, and a removable adapter for attaching the slide retainer to a differently configured ram head, the removable adapter having a shank piece and a connecting rod, the shank piece having an enlarged upper body connected to a lower head by a shank, the connecting rod having an upper head and a shank that is threaded at a lower end, the connecting rod being screwed into the shank piece to clamp the adapter to the ram head, and the adapter having an upper shank that fits into a bore of the ram head and a flange that fits beneath the plate of the slide retainer assembly.

8. A terminal assembly die for installation in a press having a bed and a ram head that moves vertically toward and away from the bed, the terminal assembly die comprising a base unit assembly that is generally L-shaped and has horizontal and vertical members, the horizontal member having means for clamping the base unit to a bed of a press, the vertical member having an upper portion that is generally U-shaped in cross section to provide spaced side portions that provide a vertical slide that receive a slide retainer assembly that holds an upper tool pack assembly, the slide retainer assembly having a retainer block that is equipped with a core adjuster and an insulation adjuster, the core adjuster including an adjuster slide that translates with respect to the retainer block and a strike pad having an upper strike surface that is raised and lowered with respect to the retainer block by the adjuster slide, and the insulation adjuster including a second adjuster slide that translates with respect to the retainer block and a second strike pad having a lower strike surface that is raised and lowered with respect to the retainer block by the second adjuster slide.

9. The terminal assembly die as defined in claim 8 wherein the adjuster slide and the second adjuster slide are disposed parallel to each other.

10. The terminal assembly die as defined in claim 9 wherein the core adjuster is operated by a rotary operator that extends through an axial bore of the adjuster slide and the insulation adjuster is operated by a second rotary operator that extends through an axial bore of the second adjuster slide.

* * * * *